US012768200B2

(12) United States Patent
Farag

(10) Patent No.: US 12,768,200 B2
(45) Date of Patent: Oct. 20, 2026

(54) REKEYABLE LOCK CYLINDER WITH DOUBLE SIDED KEYWAY

(71) Applicant: ASSA ABLOY Americas Residential Inc., New Haven, CT (US)

(72) Inventor: Hanna Farag, Jurupa Valley, CA (US)

(73) Assignee: ASSA ABLOY Americas Residential Inc., New Haven, CT (US)

(*) Notice: Subject to any disclaimer, the term of this patent is extended or adjusted under 35 U.S.C. 154(b) by 0 days.

(21) Appl. No.: 18/972,022

(22) Filed: Dec. 6, 2024

(65) Prior Publication Data

US 2025/0188769 A1 Jun. 12, 2025

Related U.S. Application Data

(60) Provisional application No. 63/608,897, filed on Dec. 12, 2023.

(51) Int. Cl.

| | |
|---|---|
| ***E05B 27/00*** | (2006.01) |
| ***E05B 27/08*** | (2006.01) |
| ***E05B 35/14*** | (2006.01) |

(52) U.S. Cl.

CPC ........ *E05B 27/005* (2013.01); *E05B 27/0007* (2013.01); *E05B 27/08* (2013.01); *E05B 35/14* (2013.01); *E05B 27/0082* (2013.01)

(58) Field of Classification Search

CPC .. E05B 27/00; E05B 27/0021; E05B 27/0035; E05B 27/005; E05B 27/0057; E05B 27/0082; E05B 29/004; E05B 29/006; E05B 29/0066; E05B 35/0008; E05B 35/083; E05B 27/08; E05B 27/007; E05B 35/14

See application file for complete search history.

(56) References Cited

U.S. PATENT DOCUMENTS

| | | | | |
|---|---|---|---|---|
| 7,900,491 | B2 * | 3/2011 | Chong | E05B 27/005 70/495 |
| 8,033,150 | B2 | 10/2011 | Armstrong | |
| 8,099,988 | B1 | 1/2012 | Wheatland | |
| 8,656,747 | B2 | 2/2014 | Armstrong | |
| 9,657,499 | B2 * | 5/2017 | Emory | E05B 29/004 |
| 10,612,271 | B2 | 4/2020 | Farag | |

(Continued)

OTHER PUBLICATIONS

U.S. Appl. No. 63/516,693 entitled "Rekeyable Lock Cylinder" filed on Jul. 31, 2023, Applicant Assa Abloy Americas Residential, 52 pages.

(Continued)

*Primary Examiner* — Christine M Mills
*Assistant Examiner* — Faria F Ahmad
(74) *Attorney, Agent, or Firm* — Merchant & Gould P.C.

(57) ABSTRACT

A rekeyable lock cylinder with a cylinder body and a rotatable plug assembly is provided. The plug assembly includes a plurality of first key followers and a corresponding plurality of first racks for operation of a first locking bar. Additionally, the plug assembly includes a plurality of second key followers and a corresponding plurality of second racks for operation of a second locking bar. The first and second key followers and first and second racks can be rekeyed while the plug assembly is disposed within the cylinder body. The first and second key followers face each other within a keyway opening of the plug assembly and are independently operable.

21 Claims, 10 Drawing Sheets

(56) References Cited

U.S. PATENT DOCUMENTS

| | | | | |
|---|---|---|---|---|
| 11,220,840 | B1 | 1/2022 | Farag | |
| 11,319,726 | B2 | 5/2022 | Rufang | |
| 11,572,708 | B2 * | 2/2023 | Farag | E05B 27/005 |
| 11,988,018 | B2 * | 5/2024 | Farag | E05B 27/0057 |
| 12,024,921 | B2 * | 7/2024 | Rufang | E05B 27/0082 |
| 12,104,404 | B2 * | 10/2024 | Farag | E05B 27/0082 |
| 12,188,258 | B1 * | 1/2025 | Farag | E05B 27/005 |
| 12,421,762 | B2 * | 9/2025 | Farag | E05B 35/008 |
| 2005/0120765 | A1 | 6/2005 | Erdely | |
| 2010/0206025 | A1 | 8/2010 | Boesel | |
| 2015/0252590 | A1 | 9/2015 | Hollman | |
| 2016/0369527 | A1 | 12/2016 | Farag et al. | |
| 2022/0213716 | A1 | 7/2022 | Farag | |
| 2025/0043593 | A1 * | 2/2025 | Farag | E05B 31/00 |
| 2025/0101770 | A1 * | 3/2025 | Huynh | E05B 27/083 |
| 2025/0333979 | A1 * | 10/2025 | You | E05B 17/0012 |

OTHER PUBLICATIONS

PCT International Search Report and Written Opinion in Application PCT/US2024/058872, mailed Apr. 3, 2025, 12 pages.

* cited by examiner

REKEYABLE LOCK CYLINDER WITH DOUBLE SIDED KEYWAY

CROSS-REFERENCE TO RELATED APPLICATION(S)

This application claims the benefit of priority to U.S. Provisional Application No. 63/608,897, filed Dec. 12, 2023, the entire disclosure of which is incorporated herein by reference in its entirety.

BACKGROUND

Lock cylinders that can be rekeyed without removal of a plug assembly are known. These types of locks are highly beneficial to consumers because the locks can be easily rekeyed without calling a locksmith. These rekeyable locks typically include a plurality of key followers that are engaged with a plurality of racks. The key followers can removably couple to the racks at a plurality of different positions so as to facilitate rekeying and which define the number of possible key cut combinations. This system, however, has a relatively low (e.g., thousands of possible combinations) number of possible key cut combinations. As such, there is a need for a rekeyable lock that increases the number of possible key cut combinations.

SUMMARY

This disclosure relates generally to locks, and in particular, this disclosure relates to a lock with a rekeyable lock cylinder. The rekeyable lock cylinder includes a plug assembly rotatably disposed within a cylinder body. The plug assembly includes a pair of independent rekeyable key follower and rack assembly systems that are rekeyable while the plug assembly is disposed within the cylinder body. The pair of key followers face each other within the plug assembly and are operable with a key having two key cuts. The configuration of the pair of key follower and rack assembly systems increase the number of possible key cut combinations for the rekeyable lock cylinder and without increasing the size of the cylinder body.

In an aspect, the technology relates to a rekeyable lock cylinder including: a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body; at least one first key follower slidably mounted on the plug body; at least one second key follower slidably mounted on the plug body; a first carrier subassembly supported by the plug body, the first carrier subassembly including: a first carrier selectively slidable along the longitudinal axis for rekeying between different keys; a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body, the second carrier subassembly including: a second carrier selectively slidable along the longitudinal axis for rekeying between different keys; a second locking bar slidable mounted on the second carrier and selectively engageable with the second locking bar engaging slot to block rotation of the plug assembly relative to the cylinder body; and at least one second rack coupled between the at least one second key follower and the second locking bar to control movement of the second locking bar.

In an example, the at least one first key follower is biased in an opposite direction relative to the at least one second key follower. In another example, the at least one first key follower is axially aligned with the at least one second key follower. In yet another example, the at least one first key follower is identical to the at least one second key follower. In still another example, the first locking bar is biased in an opposite direction relative to the second locking bar. In an example, the first locking bar is biased in a same direction relative to the second locking bar.

In another example, both the first carrier and the second carrier axially slide for a rekeying operation. In yet another example, axial movement of the first and second carriers are coupled together. In still another example, a first assembly that includes the at least one first key follower, the at least one first rack, and the first locking bar is independently operable relative to a second assembly that includes the at least one second key follower, the at least one second rack, and the second locking bar. In an example, the first locking bar engaging slot is spaced 180° apart from the second locking bar engaging slot. In another example, the first locking bar engaging slot has a same size and shape as the second locking bar engaging slot.

In yet another example, the plug body defines a keyway opening, the at least one first key follower disposed on an opposite side of the keyway opening from the at least one second key follower. In still another example, the keyway opening is defined by at least one projection or at least one recess of the plug body and disposed between the at least one first and second key followers.

In another aspect, the technology relates to a rekeyable lock cylinder assembly including: a key having a blade with a first key cut and a second key cut, the first key cut facing in an opposite direction relative to the second key cut; a cylinder body defining a longitudinal axis, wherein the cylinder body defines a first locking bar engaging slot and a second locking bar engaging slot; and a plug assembly disposed at least partially within the cylinder body, the plug assembly including: a plug body defining a keyway opening for receiving the key; at least one first key follower slidably mounted on the plug body and configured to interact with the first key cut when the key is received within the keyway opening; at least one second key follower slidably mounted on the plug body and configured to interact with the second key cut when the key is received within the keyway opening; a first carrier subassembly supported by the plug body, the first carrier subassembly including: a first carrier selectively slidable along the longitudinal axis for rekeying between different keys; a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body and independent from the first carrier subassembly, the second carrier subassembly including: a second carrier selectively slidable along the longitudinal axis for rekeying between different keys; a second locking bar slidable mounted on the second carrier and selectively engageable with the second locking bar engaging slot to block rotation of the plug assembly relative to the cylinder body; and at least one second rack coupled between the at least one second key follower and the second locking bar to control movement of the second locking bar.

In an example, the keyway opening defines a centerline axis that is co-axial with the longitudinal axis. In another example, the blade of the key includes at least one projection or at least one recess axially extending between the first and second key cuts. In yet another example, the at least one key first follower is identical to the at least one second key follower. In still another example, the at least one first rack is identical to the at least one second rack. In an example, the first locking bar is identical to the second locking bar.

In another example, the first key cut includes one or more bitting positions that axially align with the second key cut.

In another aspect, the technology relates to a method of assembling a rekeyable lock cylinder including: providing a cylinder body defining a longitudinal axis, wherein the cylinder body defines a first locking bar engaging slot and a second locking bar engaging slot; providing a plug assembly having a plug body; mounting at least one first key follower and a first carrier subassembly to the plug body, the first carrier subassembly including a first carrier selectively slidable along the longitudinal axis for rekeying between different keys, a first locking bar slidably mounted on the first carrier and selectively engageable with the first locking bar engaging slot to block rotation of the plug assembly relative to the cylinder body, and at least one first rack coupled between the at least one first key follower and the first locking bar to control movement of the first locking bar; mounting at least one second key follower and a second carrier subassembly to the plug body, the second carrier subassembly including a second carrier selectively slidable along the longitudinal axis for rekeying between different keys, a second locking bar slidably mounted on the second carrier and selectively engageable with the second locking bar engaging slot to block rotation of the plug assembly relative to the cylinder body, and at least one second rack coupled between the at least one second key follower and the second locking bar to control movement of the second locking bar; and assembling the plug assembly including the first and second carrier subassemblies into the cylinder body.

In an example, the method further includes cutting a key with a first key cut and a second key cut, the first key cut facing in an opposite direction relative to the second key cut. In another example, the method further includes mounting the rekeyable lock cylinder in a door handle or deadbolt latch.

In another aspect, the technology further relates to a method of rekeying a rekeyable lock cylinder includes: inserting a first key into a keyway opening of a plug body of a plug assembly of the rekeyable lock cylinder, the first key having a first key cut and a second key cut, the plug assembly including at least one first key follower, at least one second key follower, a first carrier subassembly with a first carrier, a first locking bar, and at least one first rack coupled between the at least one first key follower and the first locking bar, and a second carrier subassembly with a second carrier, a second locking bar, and at least one second rack coupled between the at least one second key follower and the second locking bar, wherein the first key cut positions the first locking bar in an unlocked position via the at least one first key follower and the second key cut positions the second locking bar in an unlocked position via the at least one second key follower; rotating the plug assembly within a cylinder body; axially displacing the first carrier having the at least one first rack such that the at least one first rack is disengaged with the at least one first key follower; axially displacing the second carrier having the at least one second rack such that the at least one second rack is disengaged with the at least one second key follower; removing the first key; inserting a second key having at least one third key cut; and rotating the plug assembly so as to reengage the at least one first rack with the at least one first key follower and reengage the at least one second rack with the at least one second key follower and the first and second locking bars are rekeyed to the at least one third key cut that is different than the first key cut or the second key cut.

In an example, axially displacing the first carrier occurs simultaneously with axially displacing the second carrier. In another example, axially displacing the first carrier and axially displacing the second carrier occurs with a single user action. In yet another example, the method further includes cutting the second key with the at least one third key cut.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
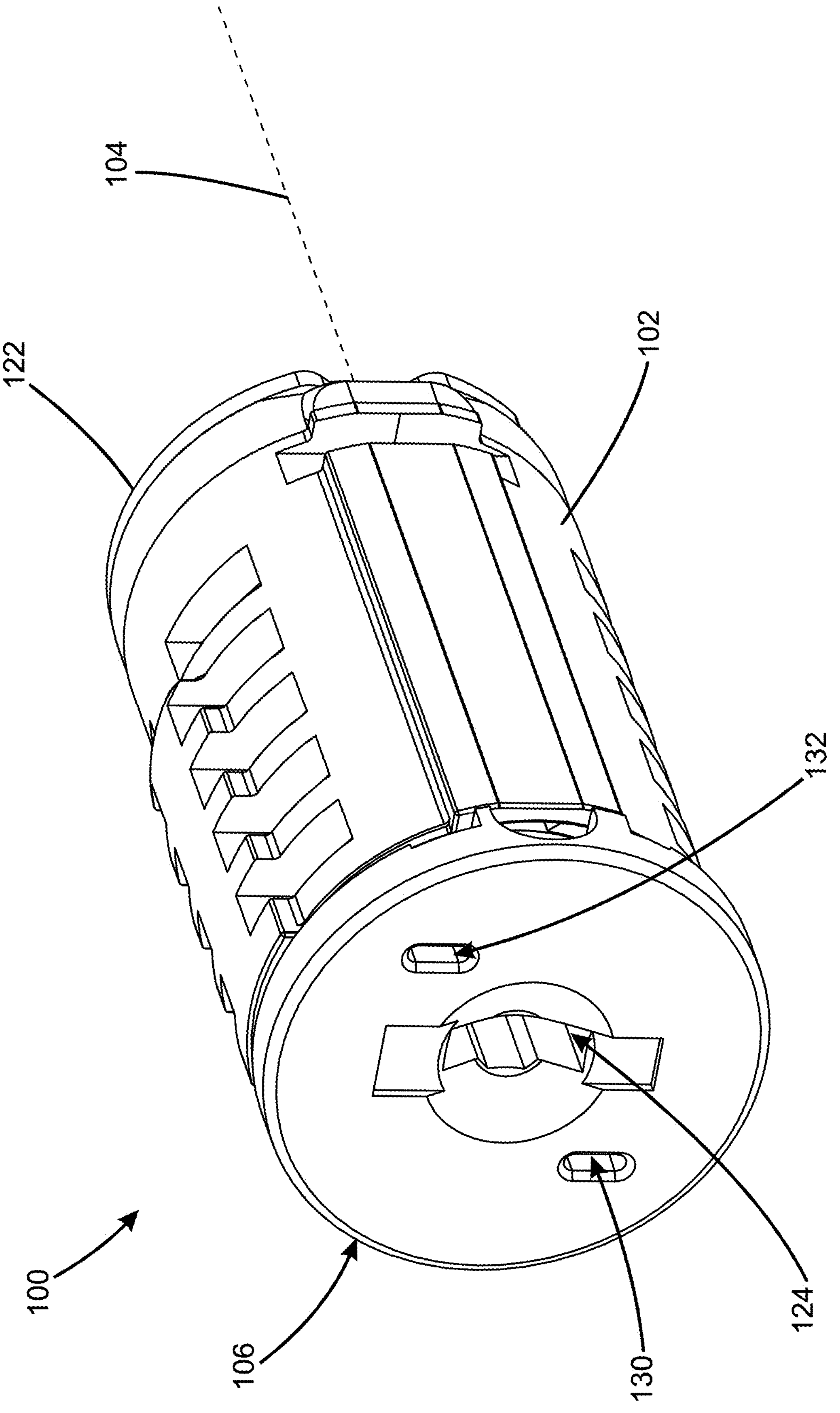
FIG. 1 is a perspective view of an exemplary rekeyable lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," "an example," "an aspect," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

Throughout this description, references to orientation (e.g., front (ward), rear (ward), top, bottom, back, right, left, upper, lower, etc.) of the components of the rekeyable lock cylinder relate to their position when installed on a door or handle and are used for ease of description and illustration only. No restriction is intended by use of the terms regardless of how the components of the rekeyable lock cylinder are situated on its own. As used herein, the terms "axial" and "longitudinal" refer to directions and orientations, which extend substantially parallel to a centerline of the component or system. Moreover, the terms "radial" and "radially" refer to directions and orientations, which extend substantially perpendicular to the centerline of the component or system. In addition, as used herein, the term "circumferential" and "circumferentially" refer to directions and orientations, which extend arcuately about the centerline of the component or system.

In the examples described below, a rekeyable lock cylinder is provided. The rekeyable lock cylinder includes a rekeyable first carrier subassembly and a rekeyable second carrier subassembly that are rekeyable without needing to remove the carrier subassemblies from a cylinder body. The first carrier subassembly includes a first locking bar and a plurality of first racks which are coupled to a plurality of corresponding first key followers. The second carrier subassembly includes a second locking bar and a plurality of second racks which are coupled to a plurality of corresponding second key followers. The first and second carrier subassemblies are independently operable and provide an increase in a number of possible key cut combinations for operation of the rekeyable lock cylinder. Additionally, the first and second carrier subassemblies do not increase the sized of the cylinder body.

Figure 2:
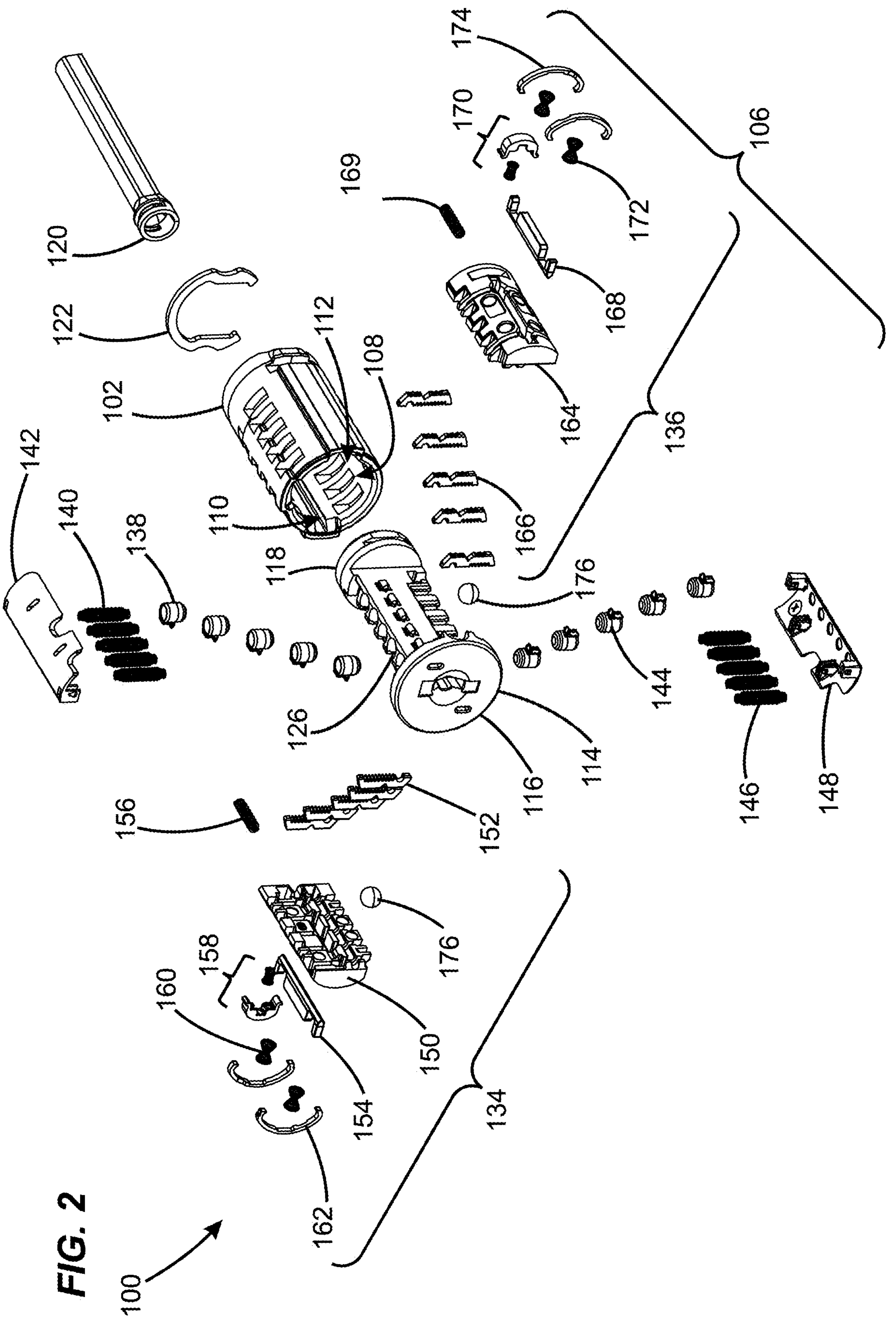
FIG. 2 is a perspective, exploded view of the rekeyable lock cylinder shown in FIG. 1.

FIG. 1 is a perspective view of an exemplary rekeyable lock cylinder 100. FIG. 2 is a perspective, exploded view of the rekeyable lock cylinder 100. Referring concurrently to FIGS. 1 and 2, the rekeyable lock cylinder 100 includes a cylinder body 102 defining a longitudinal axis 104 and a plug assembly 106 disposed at least partially within the cylinder body 102 and selectively rotatable around the longitudinal axis 104. The cylinder body 102 is substantially cylindrical in shape and hollow. In the example, the cylinder body 102 has an inner surface 108 that defines at least one longitudinally extending slot. The cylinder body 102 includes a first locking bar engaging slot 110 and a second locking bar engaging slot 112. The first and second locking bar engaging slots 110, 112 are spaced approximately 180° apart from each other and extend parallel to the longitudinal axis 104.

The plug assembly 106 includes a plug body 114 having a first end 116 and an opposite second end 118 extending along the longitudinal axis 104. The second end 118 is configured to couple to a torque blade 120 via a retainer clip 122. A washer may be disposed between the retainer clip 122 and the cylinder body 102 so that the plug body 114 is rotatable relative to the cylinder body 102. The torque blade 120 is configured to couple to a latch assembly (not shown) so as to drive operation of a latch and/or deadbolt. The second end 118 of the plug body 114 includes a circumferential recess for receiving at least a portion of the retainer clip 122 and so that the plug assembly 106 is retained within the cylinder body 102. The first end 116 is a plug face and defines a keyway opening 124 that extends into an intermediate portion 126 between the first end 116 and the second end 118. The plug body 114 is described further below and with reference to FIGS. 8-11.

Figure 4:
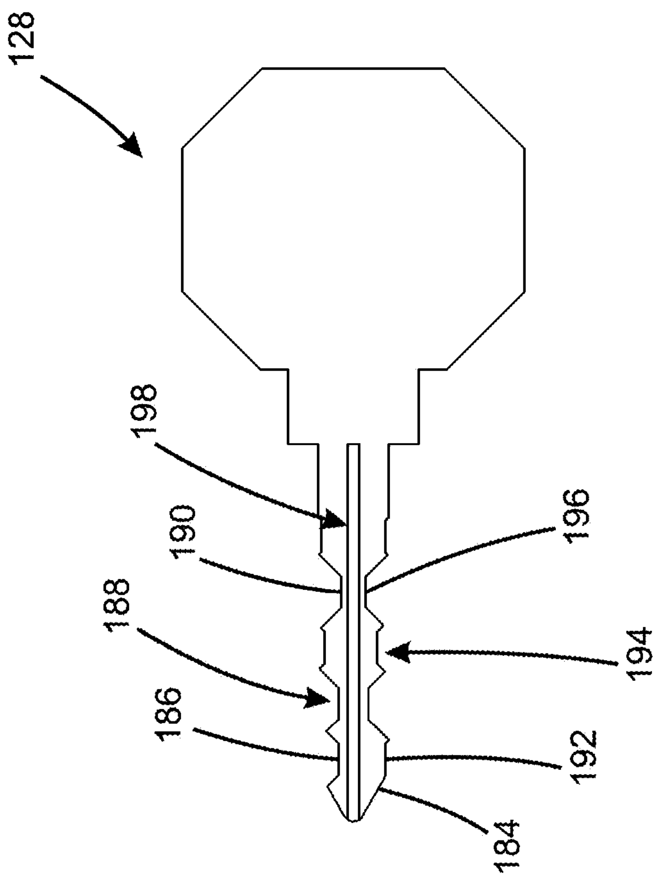
FIG. 4 is a schematic view of a key for use with the rekeyable lock cylinder shown in FIGS. 1 and 2.

The keyway opening 124 is shaped and sized to receive a key 128 (shown in FIG. 4). The first end 116 of the plug body 114 also defines a first rekeying tool opening 130 on one side of the keyway opening 124 and a second rekeying tool opening 132 on the other side. The first and second rekeying tool openings 130, 132 extend substantially parallel to the keyway opening 124 and the longitudinal axis 104. The first rekeying tool opening 130 is aligned with and facilitates access to a first carrier subassembly 134 that is slidably supported on one side of the intermediate portion 126 of the plug body 114. The second rekeying tool opening 132 is aligned with and facilitates access to a second carrier subassembly 136 that is slidably supported on the other side of the intermediate portion 126 of the plug body 114. The first and second carrier subassemblies 134, 136 facilitates the rekeyable lock cylinder 100 to be rekeyed between different keys.

In the example, the first and second rekeying tool openings 130, 132 are substantially oval in shape. The first and second rekeying tool openings 130, 132 are also disposed at opposite ends and on opposite sides of the keyway opening 124. This is because the first and second carrier subassemblies 134, 136 are both mirrored and flipped with respect to one another. In other aspects, the first and second rekeying tool openings 130, 132 may have any other size, shape, or position as required or desired. In an example, the first and second rekeying tool openings 130, 132 may have different sizes or shapes as required or desired.

A plurality of first key followers 138 are slidably mounted to the plug body 114 and are biased with first biasing members 140 (e.g., a compression spring). The first key followers 138 and the first biasing members 140 are retained within the plug body 114 by a first retaining cap 142. The first key followers 138 operationally couple to the first carrier subassembly 134. Additionally, a plurality of second key followers 144 are slidably mounted to the plug body 114 and are biased with second biasing members 146 (e.g., a compression spring). The second key followers 144 and the second biasing members 146 are retained within the plug body 114 by a second retaining cap 148. The second key followers 144 operationally couple to the second carrier subassembly 136.

The first carrier subassembly 134 includes a first carrier 150, a plurality of first racks 152 slidably supported on the first carrier 150, and a first locking bar 154. The first carrier 150 is selectively slidable along the longitudinal axis 104 for rekeying between different keys and is biased with a first return spring 156. Additionally, a first spring catch 158 is provided for the first carrier 150 for rekeying. The first locking bar 154 is slidably mounted on the first carrier 150 and at least partially within a first locking bar slot. The first locking bar 154 is biased with a pair of first biasing members 160 (e.g., compression spring) which are retained on the first carrier 150 by a pair of first clips 162. The first racks 152 are coupled between the first key followers 138 and the first locking bar 154 so as to control movement of the first locking bar 154.

The second carrier subassembly 136 includes a second carrier 164, a plurality of second racks 166 slidably supported on the second carrier 164, and a second locking bar 168. The second carrier 164 is selectively slidable along the longitudinal axis 104 for rekeying between different keys and is biased with a second return spring 169. Additionally, a second spring catch 170 is provided for the second carrier 164 for rekeying. The second locking bar 168 is slidably mounted on the second carrier 164 and at least partially within a second locking bar slot. The second locking bar 168 is biased with a pair of second biasing members 172 (e.g., compression spring) which are retained on the second carrier 164 by a pair of second clips 174. The second racks 166 are coupled between the second key followers 144 and the second locking bar 168 so as to control movement of the second locking bar 168.

In the example, movement of the first key followers 138 and the first racks 152, and thereby, the first locking bar 154 is independent of the movement of the second key followers 144 and the second racks 166, and thereby, the second locking bar 168. This structure facilitates receipt of the key 128 having two independent key cuts.

The rekeyable lock cylinder 100 also includes one or more anti-drill features 176 (e.g., steel balls) that are positioned between the first end 116 of the plug body 114 and the first and second carriers 150, 164.

Figure 3:
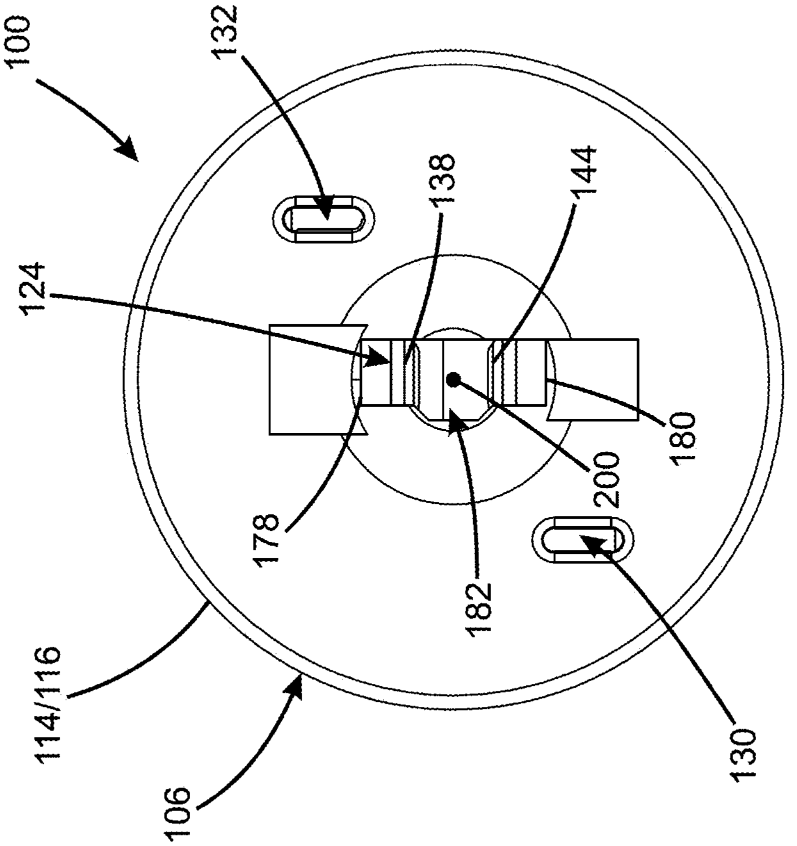
FIG. 3 is an end view of the rekeyable lock cylinder shown in FIGS. 1 and 2.

FIG. 3 is an end view of the rekeyable lock cylinder 100. FIG. 4 is a schematic view of the key 128 for use with the rekeyable lock cylinder 100 (shown in FIG. 3). Referring concurrently to FIGS. 3 and 4, the first end 116 of the plug body 114 defines the keyway opening 124 for the key 128 to operationally engage the plug assembly 106. The keyway opening 124 is elongated in a transverse direction relative to the longitudinal axis 104 (shown in FIG. 1) and includes a first end 178 and an opposite second end 180. In the example, the first end 178 is disposed above the second end 180. In other examples, the first end 178 may be disposed below, to the left, or to the right of the second end 180.

The first key followers 138 are disposed at least partially within the first end 178 of the keyway opening 124 and the second key followers 144 are disposed at least partially within the second end 180 of the keyway opening 124. The first and second key followers 138, 144 are spaced apart from each other and configured to engage with the key 128 when it is inserted into the keyway opening 124. In operation, both the first and second key followers 138, 144 must be moved within the plug assembly 106 to a position that corresponds with the first and second locking bars 154, 168 (shown in FIG. 2) being able to facilitate rotation of the plug assembly 106 as described herein.

Because the first and second key followers 138, 144 face each other, the movement of each of the key followers within the plug body 114 and relative to the keyway opening 124 is relatively small and confined to the respective ends 178, 180 of the keyway opening 124. Accordingly, the first and second key followers 138, 144 move within the plug body 114 a distance that is less than a length of the keyway opening 124 between the first and second ends 178, 180. In an aspect, the first and second key followers 138, 144 move within the plug body 114 a distance that is less than half of the length of the keyway opening 124 between the first and second ends 178, 180. This reduced movement of the first and second key followers 138, 144 allows for a tighter tolerance of the plug assembly 106 when compared lock cylinders that have key followers that move completely or mostly along the entire length of the keyway opening.

Between the first end 178 and the second end 180 of the keyway opening 124, the plug body 114 defines a longitudinally extending recess 182 that is positioned between the first and second key followers 138, 144. The recess 182 is sized and shaped to receive a corresponding projection on the key 128. This feature in the keyway opening 124 facilitates proper key shape and insertion direction. In the example, the recess 182 is formed on the left sidewall of the keyway opening 124 and the right sidewall is substantially planar. In other examples, the recess 182 may be formed as a projection so as to correspond to a recess on the key. In aspects, the recess/projection may be formed on the right sidewall, while the left sidewall is planar. In other aspects, the recess/projection may be formed on both sidewalls. In still other aspects, multiple recess and/or projections may be utilized.

The key 128 has a blade 184 that is shaped and sized to be received within the keyway opening 124. The blade 184 includes a first side 186 with a first key cut 188 that is configured to interact and engage with the first key followers 138 so as to selectively position the first key followers 138 within the plug assembly 106 to unlock the rekeyable lock cylinder 100 and allow the plug assembly 106 to rotate. In the example, the first key cut 188 is defined on the top side of the blade 184 and includes a plurality of first key cut positions 190 longitudinally spaced along the blade 184. Additionally, the blade 184 includes a second side 192 with a second key cut 194 that is configured to interact and engage with the second key followers 144 so as to selectively position the second key followers 144 within the plug assembly 106 to unlock the rekeyable lock cylinder 100 and allow the plug assembly 106 to rotate. In the example, the second key cut 194 is defined on the bottom side of the blade 184 and includes a plurality of second key cut positions 196 spaced along the blade 184. In the example, the first and second key cut positions 190, 196 are axially aligned with each other. The key 128 also includes a recess 198 that longitudinally extends between the first and second key cuts 188, 194. The opposite side of the key 128 (not shown) includes a projection that is shaped and sized to be received within the recess 182 of the keyway opening 124.

In operation, the first key cut 188 is independent and at a different position on the blade 184 than the second key cut 194. As such, both the first and second key followers 138, 144 are independently positioned within the plug assembly 106 and both the first and second key followers 138, 144 are required to be properly positioned in order to unlock the rekeyable lock cylinder 100 and allow the plug assembly 106 to rotate. Both the first and second key cuts 188, 194 are configured to independently move the first and second key followers 138, 144, respectively, to vertical positions within the plug assembly 106. Accordingly, the number of possible key cut combinations of the rekeyable lock cylinder 100 is increased as described herein.

In the example, the keyway opening 124 defines a centerline axis 200 that is co-axial with the longitudinal axis 104 of the cylinder body 102. As such, the keyway opening 124 is centered within the first end 116 of the plug body 114. In other examples, the keyway opening 124 may be offset towards the first key followers 138 or the second key followers 144 as required or desired.

Figure 5:
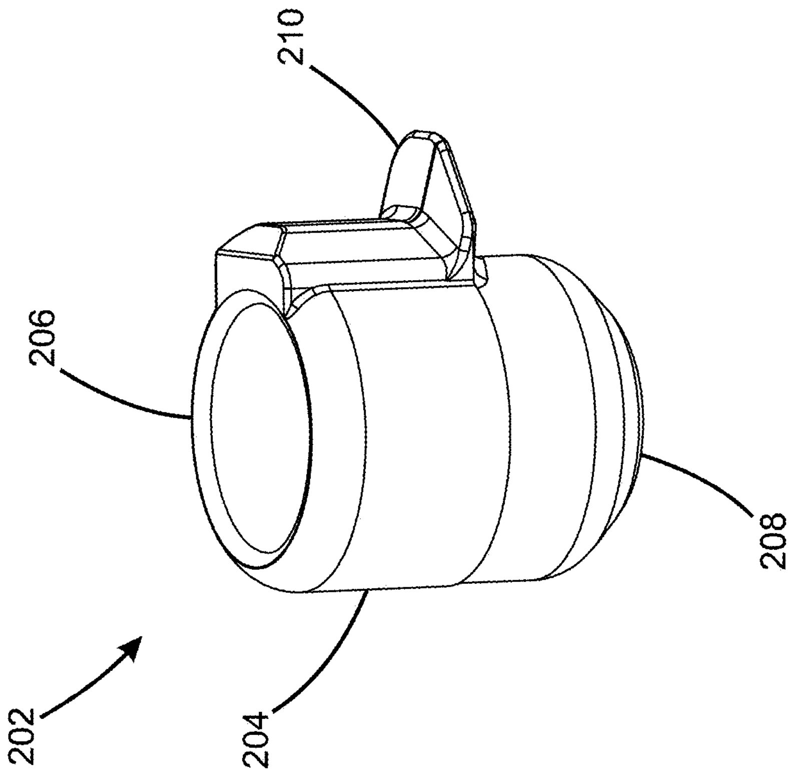
FIG. 5 is a perspective view of a key follower for use with the rekeyable lock cylinder shown in FIGS. 1 and 2.

FIG. 5 is a perspective view of a key follower 202 for use with the rekeyable lock cylinder 100 (shown in FIGS. 1 and 2). The key follower 202 includes a cylindrical body 204 with a top end 206 and an opposite bottom end 208. The top end 206 is open such that the biasing member is at least partially received within the body 204. The bottom end 208 has a tapered nose that is configured to engage with the key 128 (shown in FIG. 4) when inserted within the lock cylinder and move the key follower 202 within the plug assembly 106 (shown in FIG. 2). The key follower 202 is also known as a pin follower.

The body 204 includes a rack engagement feature 210 extending from one side. The rack engagement feature 210 is configured to selectively engage with the rack 212 (shown in FIG. 6) and in a plurality of different positions. In the example, the rack engagement feature 210 is a fin extension that extends orthogonally from the body 204. In other examples, the rack engagement features 210 may be a post, a ridge, any other extension like element, or a plurality of any other extension like element that facilitates operation of the key follower 202 as described herein.

Figure 6:
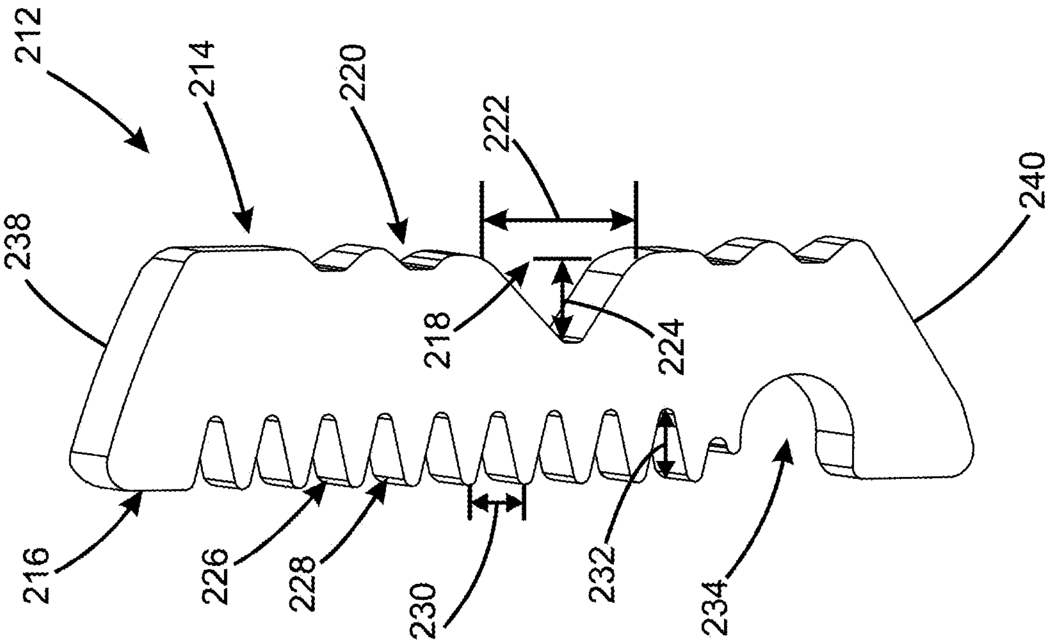
FIG. 6 is a perspective view of a rack for use with the rekeyable lock cylinder shown in FIGS. 1 and 2.

FIG. 6 is a perspective view of a rack 212 for use with the rekeyable lock cylinder 100 (shown in FIGS. 1 and 2). The rack 212 has a first side 214 that faces the locking bar 242 (shown in FIG. 7) and an opposite second side 216 that faces the key follower 202 (shown in FIG. 5). A locking bar engaging groove 218 is defined in the first side 214 and the groove 218 extends towards the second side 216. The first side 214, above and below the locking bar engaging groove 218, may include one or more anti-pick grooves 220. The locking bar engaging groove 218 is defined at least partially by a height 222 extending between top and bottom edges on the first side 214 and a depth 224 that extends transverse relative to the height 222 and to the inward most portion of the groove 218. The locking bar engaging groove 218 is shaped and sized so as to at least partially receive the locking bar 242.

A pin engagement feature 226 is defined on the second side 216. The pin engagement feature 226 is configured to selectively engage with the key follower 202 and in a plurality of different positions spaced along the height of the rack 212. The pin engagement feature 226 is configured to selectively engage with the rack engagement feature 210 of the key follower 202. In the example, the pin engagement feature 226 includes a plurality of grooves 228 that correspond to a possible key cut position of the key 128 (shown in FIG. 4). Each groove 228 defines a height 230 extending between top and bottom edges on the second side 216 and a transverse depth 232. The shape and size of each individual groove 228 is smaller than the locking bar engaging groove 218. In the example, half of the height 222 of the locking bar engaging groove 218 is larger than the height 230 of the groove 228. Additionally, the depth 224 of the locking bar engaging groove 218 is larger than the depth 232 of the groove 228. The second side 216 also includes a recess 234 that corresponds to a protruding feature 260 on the plug body 114 (shown in FIGS. 8-11).

As illustrated in FIG. 6, the plurality of grooves 228 are disposed proximate a first end 238 of the rack 212 and the recess 234 is disposed proximate a second end 240. In the example, the key follower 202 is configured to engage with the grooves 228 closer to the first end 238 and not all of the grooves may be used for rekeying purposes. As such, in aspects, the rack 212 may include a fewer number of grooves and grooves (e.g., three or four) only disposed proximate the first end 238.

Figure 7:
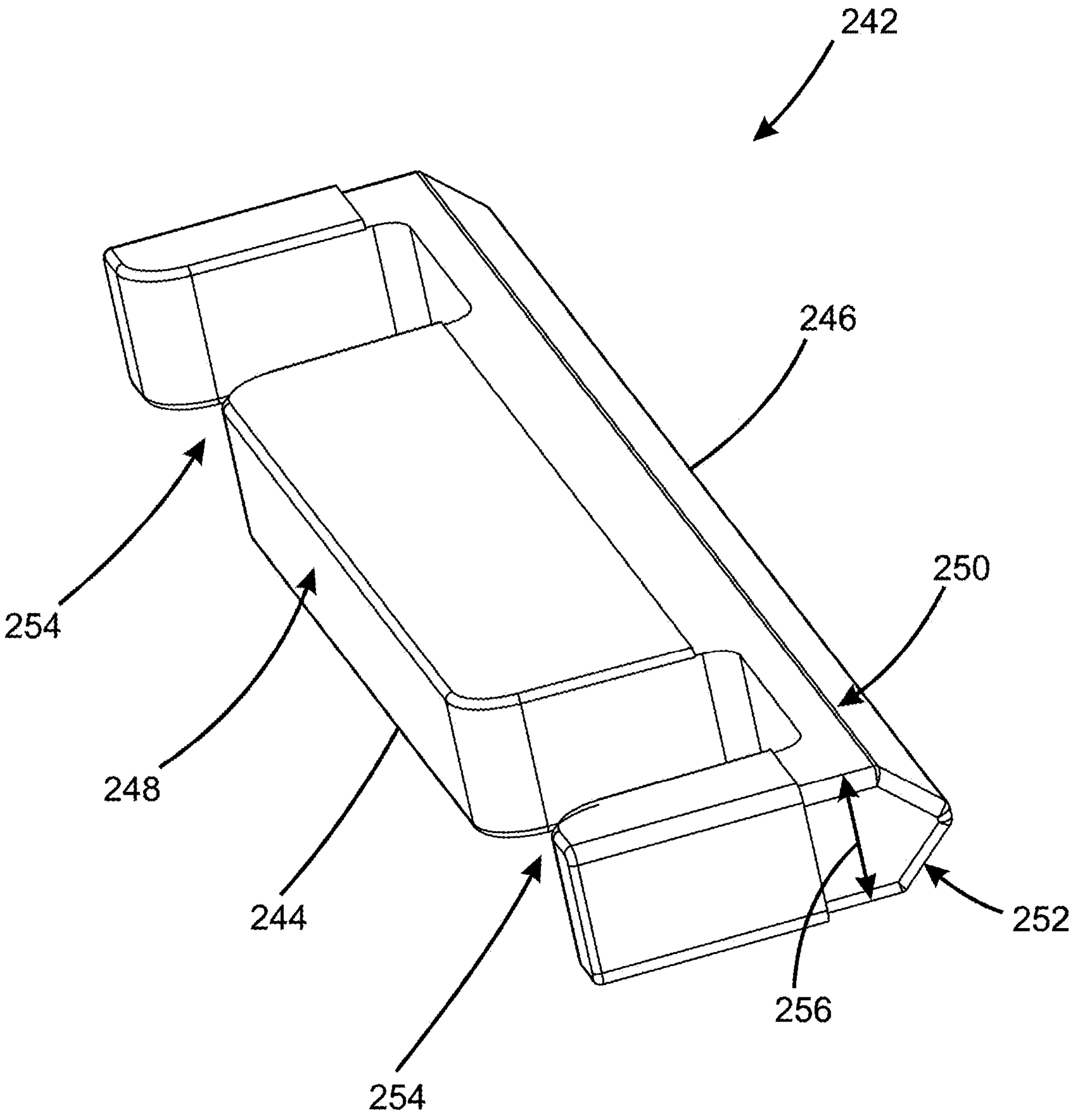
FIG. 7 is a perspective view of a locking bar for use with the rekeyable lock cylinder shown in FIGS. 1 and 2.

FIG. 7 is a perspective view of a locking bar 242 for use with the rekeyable lock cylinder 100 (shown in FIGS. 1 and 2). The locking bar 242 includes a first end 244 and an opposite second end 246. The first end 244 has a squared end with a planar surface 248 and is configured to engage with the locking bar engaging slots 110, 112 of the cylinder body 102 (both shown in FIG. 2). The second end 246 includes a tapered nose with upper and lower camming surfaces 250, 252 and is configured to engage with the locking bar engaging groove 218 of the rack 212 (shown in FIG. 6). The locking bar 242 also includes a pair of notches 254 for at least partially supporting the biasing member.

The second end 246 of the locking bar 242 has a thickness 256 defined prior to the tapered nose. The thickness 256 is less than the height 222 of the locking bar engaging groove 218 of the rack 212 (shown in FIG. 6). This configuration facilitates providing the camming action of the locking bar 242 away from rack 212 as the locking bar 242 is biased in a direction towards the rack 212. Additionally, by having the locking bar engaging groove 218 of the rack 212 larger than the second end 246 of the locking bar 242, the second end 246 can more easily slide all the way in so that the plug assembly 106 (shown in FIG. 2) can rotate and the first end 244 disengage the locking bar engaging slots of the cylinder body.

Referring concurrently to FIGS. 4-7, the locking bar 242 and the racks 212 are slidably supported within the first or second carrier 150, 164 (shown in FIG. 2). In the example, the key follower 202, the rack 212, and the locking bar 242 correspond to the components in both the first and second carrier subassemblies 134, 136 (shown in FIG. 2) as the first and second carrier subassemblies 134, 136 have identical component configurations. In other examples, the first and second carrier subassemblies 134, 136 may have a different component configuration than what is described in FIGS. 4-7. In still other examples, the first carrier subassembly 134 may have a different component configuration than the second carrier subassembly 136.

In the example, the key follower 202, the rack 212, and the locking bar 242, and thus, the first and second carrier subassemblies 134, 136 are substantially similar to the configurations described in U.S. Pat. No. 10,612,271 B2, dated Apr. 7, 2020, and which is incorporated by reference in its entirety. In this patent, however, only a single carrier subassembly is described, and thus, it has a smaller number of key cut combinations. In other examples, one or both of the first and second key follower/rack configurations may be formed with a post/slot configuration or a multiple post/groove configuration as described in U.S. Patent Application Publication No. 2022/0213716 A1, dated Jul. 7, 2022, and which is also incorporated by reference herein in its entirety In yet other examples, the locking bar of one or both of the first and second carrier subassemblies may be biased outward (instead of inward as described herein) and as described in U.S. Pat. No. 8,033,150 B2, dated Oct. 11, 2011, incorporated by reference herein in its entirety. As such, it is appreciated that the first and second carrier subassemblies 134, 136 may have a different component configuration that what is described herein as long as the carrier subassembly facilitates a rekeyable rack and key follower engagement facilitated by a sliding carrier and a locking bar that engages with a locking bar engaging slot within the cylindrical body as described herein.

Each key follower 202 is configured to engage the rack 212 in a plurality of bitting positions (e.g., the location at which the rack engagement feature 210 of the key follower 202 is coupled to the pin engagement feature 226 of the rack 212 for operation of the rekeyable lock cylinder 100 as described herein). Because the rack 212 can engage with the key follower 202 in a plurality of positions, all of the racks 212 within the plug assembly 106 may have the same structural configuration. The term "bitting position" is referred to as a depth of a key cut in a bitting sequence of the key 128. The bitting position is typically identified by a digit or letter that indicates a depth of a key cut, and thereby, corresponds to the position of the rack 212 with respect to the key follower 202 such that movement of the key follower 202 within the rekeyable lock cylinder 100 from the key 128 positions the rack 212 in an operable position with respect to the locking bar 242. The second end 246 of the locking bar 242 is then allowed to move into the locking bar engaging groove 218 of the racks 212 and enable the plug assembly 106 (shown in FIG. 2) to rotate. Once the racks 212 are moved out of the operable position defined by the key 128, the racks 212 cam the locking bar 242 at least partially out of the locking bar engaging groove 218 and into the cylinder body 102 (shown in FIG. 2) such that rotation of the plug assembly 106 is restricted. In this example, each rack 212 has its own individual key follower 202.

When a rekeyable lock only has one carrier subassembly (e.g., U.S. Pat. No. 10,612,271 B2, U.S. Patent Application Publication No. 2022/0213716 A1, U.S. Pat. No. 8,033,150 B2), the number of possible key cut combinations for a key is defined by the number of possible engagement positions that the key follower can engage with the rack. For example, if the key follower can engage with the rack at seven different positions, and there is a series of five racks, the total amount of key cut combinations is around 16,800. In this example, however, there are two carrier subassemblies and each key follower can engage with the corresponding rack at a plurality of different engagement positions. For example, at the first carrier subassembly 134 the first key follower 138 can engage with the first rack 152 at three different positions, while the second carrier subassembly 136 is similar and the second key follower 144 can engage with the second rack 166 at three different positions. This facilitates nine different key follower positions at a single first and second rack 152, 166 pair, and if there are similarly a series of five rack pairs, the total amount of key cut combinations is around 59,000. In other examples, each carrier subassembly may have four different positions of the key follower at the rack. As such, sixteen different key follower positions at a single rack pair, and if there are a series of five rack pairs, the total amount of key cut combinations is around 1,048,500. This increase in key cut combinations occurs without increasing the outer diameter size of the cylinder body 102.

In the examples described above, the first and second carrier subassemblies 134, 136 are described as having a similar number of key follower positions on the racks (e.g., three or four). Additionally, the first and second carrier subassemblies 134, 136 have substantially similar construction. It is appreciated, that the first and second carrier subassemblies 134, 136 may have different constructions and may have a different number of key follower positions on the racks (e.g., the first having three and the second having four).

U.S. Pat. No. 11,220,840 describes using a pair of carrier subassemblies with each pair of racks engaged to a single pin follower. This configuration decreases the size of the pin follower and rack engagement positions so as to increase the number of positions for the key cut combination. For example, ten positions are described, and with a series of five rack pairs, the total amount of key cut combinations is around 100,000. This pair of carrier subassemblies are not independently operable as they are coupled together though a shared pin follower, and this configuration facilitates reducing the potential for cross-keying. In contrast, the first and second carrier subassemblies 134, 136 described herein are independently operable, and thereby, allows for an even greater increase in possible key cut combinations. This is because for each pin follower and rack engagement position, the first positions are multiplied by the second positions for the key cut calculation. Furthermore, the tolerance of the keyway opening 124 is such that the key 128 can move at least a little therein. Because both the first and second carrier subassemblies 134, 136 need to be simultaneously unlocked for rotation of the plug assembly 106 and the first and second key followers 138, 144 facing each other, cross-keying is reduced as when one key cut moves into an unlocking position with one carrier subassembly, the other key cut moves out of the unlocking position on the other carrier subassembly. U.S. Pat. No. 11,220,840 is also incorporated by reference herein in its entirety.

Further, U.S. Provisional Patent Application No. 63/516,693, filed Jul. 31, 2023, describes use of two different key cuts on a key. One key cut operates an rekeyable carrier subassembly, while the other key cut operates a set of sliders. While this configuration also increases the number of possible key cut combinations, the sliders are not rekeyable while the plug assembly is within the cylinder body. In contrast, both the first and second carrier subassemblies are rekeyable as described herein. U.S. Provisional Patent Application No. 63/516,693 is also incorporated by reference herein in its entirety.

Figure 8:
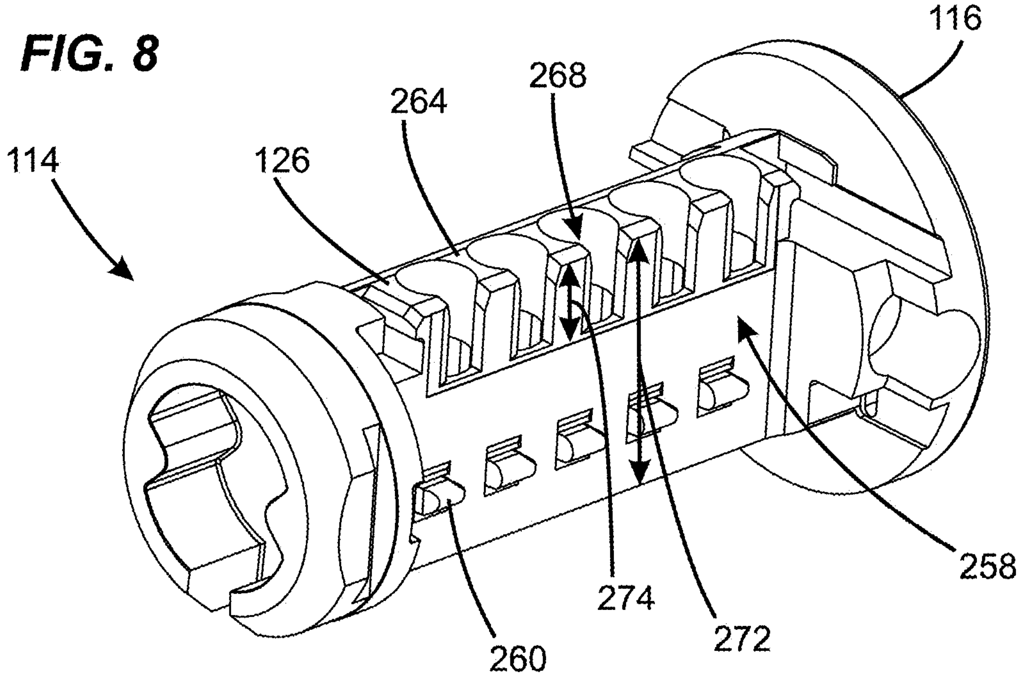
FIGS. 8, 9, and 10 are perspective views of a plug body of the rekeyable lock cylinder shown in FIGS. 1 and 2.
Figure 9:
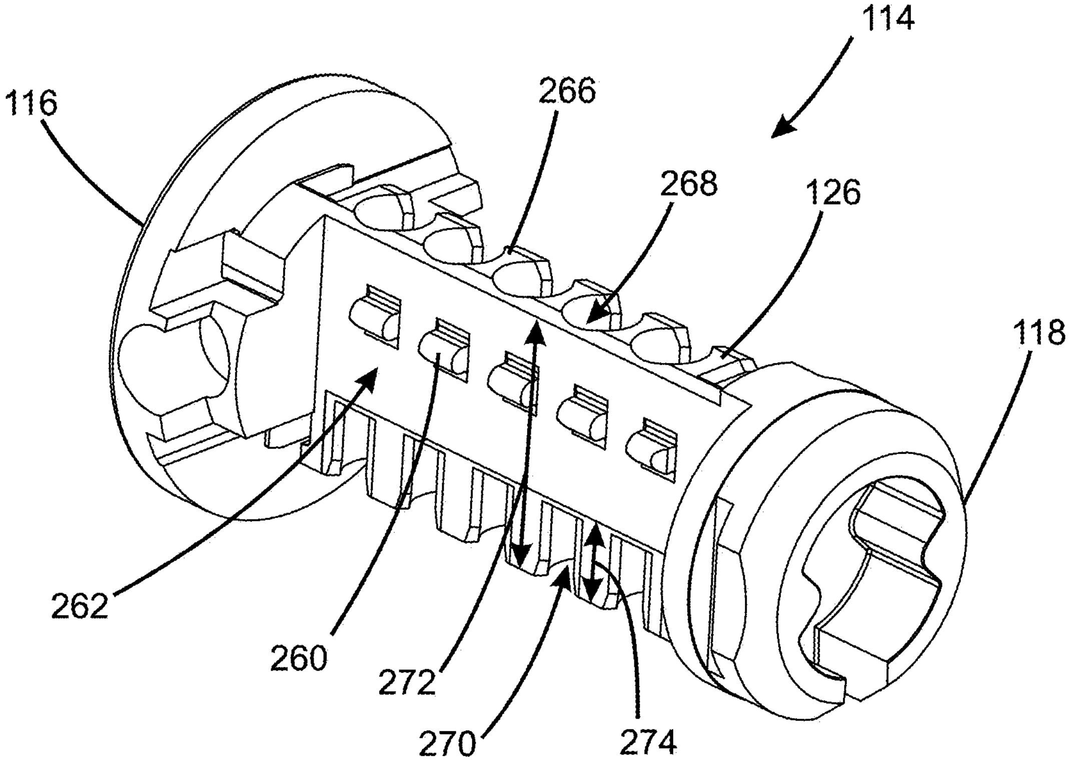
Figure 10:
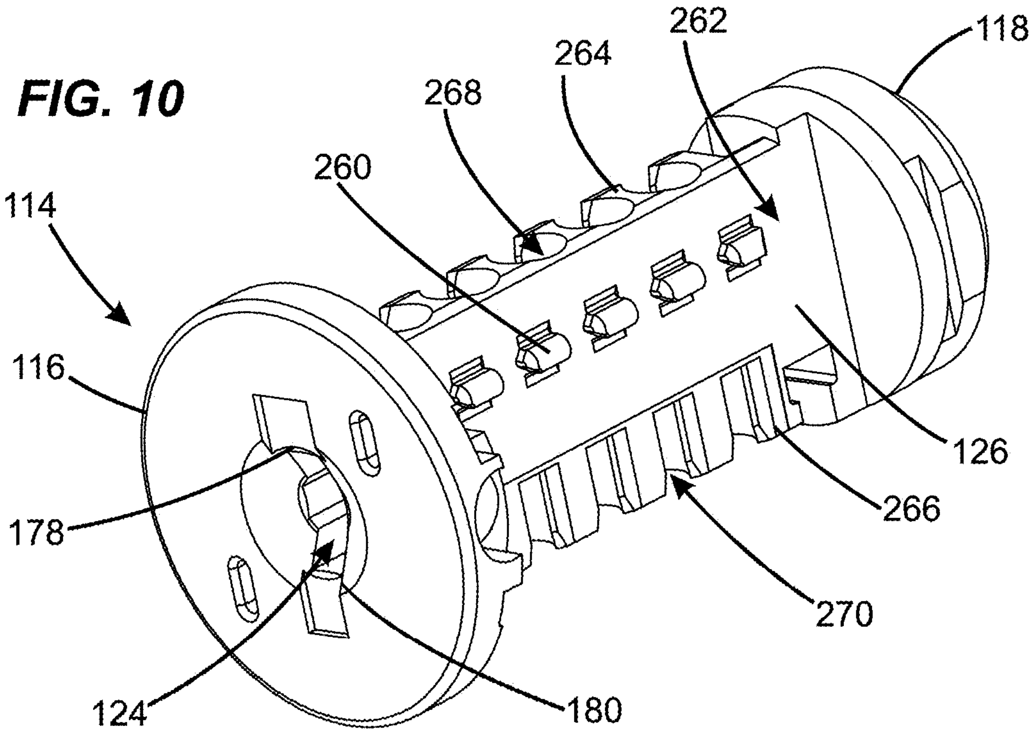
Figure 11:
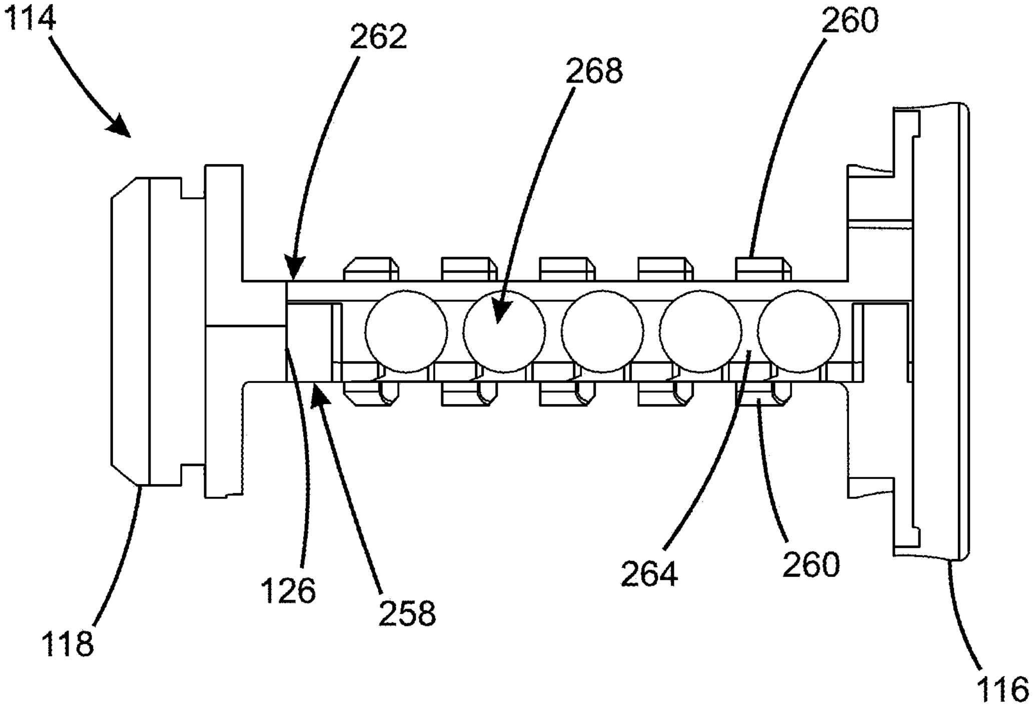
FIG. 11 is a top plan view of the plug body shown in FIGS. 8-10.

FIGS. 8-10 are perspective views of the plug body 114 of the rekeyable lock cylinder 100 (shown in FIGS. 1 and 2). FIG. 11 is a top plan view of the plug body 114. Referring concurrently to FIGS. 8-11, the plug body 114 includes the first end 116 that defines the plug face and allows entry into the keyway opening 124, the intermediate portion 126, and the second end 118. The intermediate portion 126 is substantially rectangular in shape with a first side 258 that is substantially planar and configured to receive the first carrier subassembly 134 (shown in FIG. 2) adjacent thereto. Protruding features 260 are defined on the first side 258 and are configured to facilitate rekeying of the first carrier subassembly 134. Additionally, the intermediate portion 126 includes a second side 262 that is substantially planar and configured to receive the second carrier subassembly 136 (shown in FIG. 2). The second side 262 also includes protruding features 260 that facilitate rekeying of the second carrier subassembly 136.

The intermediate portion 126 also includes a first end 264 extending between the first and second sides 258, 262 and proximate the first end 178 of the keyway opening 124. A second end 266 of the intermediate portion 126 extends between the first and second sides 258, 262 and proximate the second end 180 of the keyway opening 124. The first and second end 264, 266 and the first and second sides 258, 262 form a substantially rectangular cross-sectional shape.

Between the first and second sides 258, 262, the intermediate portion 126 defines a plurality of first channels 268 extending radially therein and from the first end 264. The first key followers 138 (shown in FIG. 2) are slidably mounted within the first channels 268 and are biased therein. A portion of the first channels 268 are open in relation to the first side 258 such that the first key followers 138 can engage with the first racks 152 (shown in FIG. 2) that are within the first carrier subassembly 134. In the example, there are five first channels 268 axially spaced within the intermediate portion 126 along the longitudinal axis 104 (shown in FIG. 1). It is appreciated that more or less than five first channels 268 may be used and depending on how many key followers are present in the rekeyable lock cylinder 100.

Additionally, between the first and second sides 258, 262, the intermediate portion 126 defines a plurality of second channels 270 extending radially therein and from the second end 266. The second key followers 144 (shown in FIG. 2) are slidably mounted within the second channels 270 and are biased therein. A portion of the second channels 270 are open in relation to the second side 262 such that the second key followers 144 can engage with the second racks 166 (shown in FIG. 2) that are within the second carrier subassembly 136. In the example, there are five second channels 270 axially spaced within the intermediate portion 126 along the longitudinal axis 104. It is appreciated that more or less than five second channels 270 may be used and depending on how many key followers are present in the rekeyable lock cylinder 100.

In the example, each of the first channels 268 and the second channels 270 are axially aligned with each other and are in open communication. The first channels 268 and the second channels 270 are also in open communication with the keyway opening 124. The protruding features 260 are axially spaced apart from the first and second channels 268, 270 in order to facilitate rekeying. The plug body 114 may be formed from steel or brass as required or desired and to facilitate strength with the relatively thin intermediate portion 126. In other examples, the first channels 268 and the second channels 270 may be axially offset along the longitudinal axis 104.

The configuration of the plug body 114 described herein facilitates supporting a pair of carrier subassemblies that are mirrored and flipped relative to one another and two sets of key followers that face each other. The intermediate portion 126 facilitates structural rigidity between the first end 116 and the second end 118 of the plug body 114 even with portions of both the first and second channels 268, 270 at least partially open with the sides. In the example, the intermediate portion 126 has a height 272 and a length 274 of the first and second channels 268, 270 that are open with the sides is less than the height 272. Accordingly, a majority of the first and second sides 258, 262 are formed without openings therein.

Figure 12:
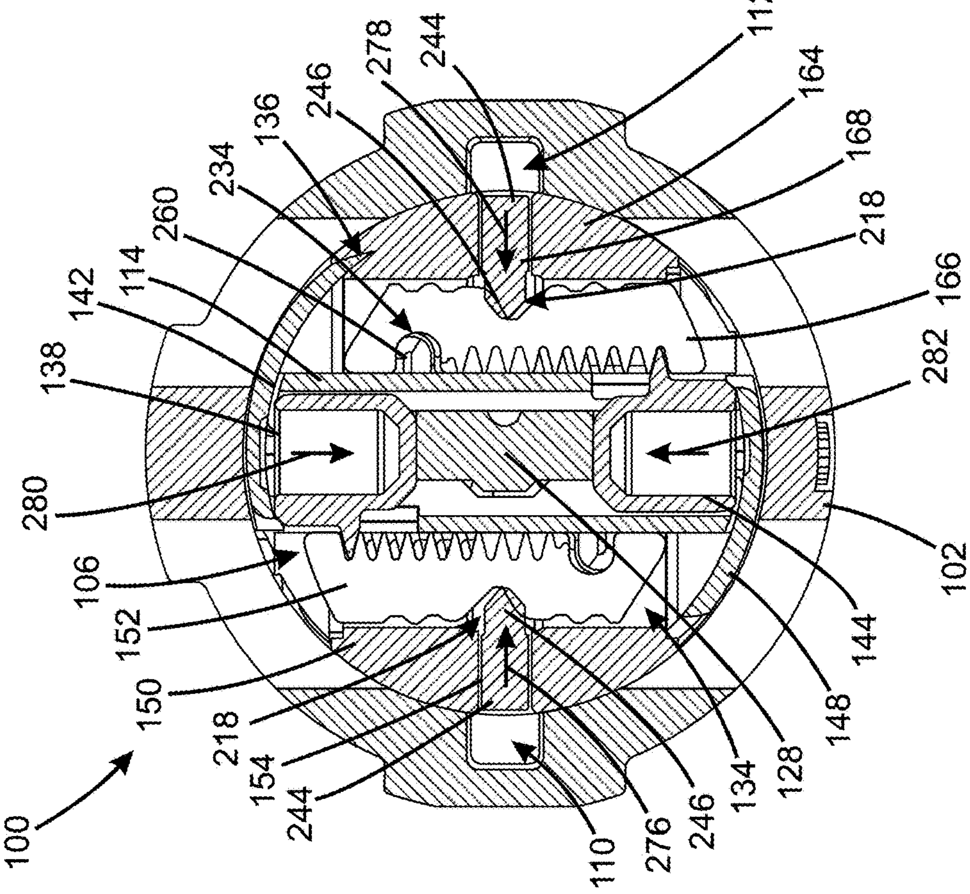
FIG. 12 is a cross-sectional view of the rekeyable lock cylinder shown in FIGS. 1 and 2 and in an unlocked configuration.

FIG. 12 is a cross-sectional view of the rekeyable lock cylinder 100 and in an unlocked configuration. Certain components are described above and not necessarily described further below. In the unlocked configuration, a valid key 128 is inserted into the keyway opening such that the first and second key followers 138, 144 are operationally positioned within the plug body 114 such that the first and second racks 152, 166 allow the first and second locking bars 154, 168 are moved/movable towards an unlocked configuration.

Starting first with the first carrier subassembly 134, the valid key 128 operationally positions the first key followers 138 vertically within the plug body 114 and against the biasing force of the biasing members (not illustrated in FIG. 12). This is performed via the first key cut 188 (shown in FIG. 4) of the key 128. The first key follower 138 moves the first rack 152 so that the locking bar engaging groove 218 is aligned with the first locking bar 154. Because the first locking bar 154 is biased inward 276, the second end 246 is urged into the locking bar engaging groove 218 so as to move the first end 244 out of the first locking bar engaging slot 110 of the cylinder body 102. Once the first locking bar 154 is out of the first locking bar engaging slot 110, the plug assembly 106 is enabled to be rotated around the longitudinal axis 104 (shown in FIG. 1).

Additionally, the valid key 128 operationally positions the second key followers 144 vertically within the plug body 114 and against the biasing force of the biasing members (not illustrated in FIG. 12). This is performed via the second key cut 194 (shown in FIG. 4) of the key 128. The second key follower 144 moves the second rack 166 so that the locking bar engaging groove 218 is aligned with the second locking bar 168. Because the second locking bar 168 is also biased inward 278, the second end 246 is urged into the locking bar engaging groove 218 so as to move the first end 244 out of the second locking bar engaging slot 112 of the cylinder body 102. Once the second locking bar 168 is out of the second locking bar engaging slot 112, the plug assembly 106 is enabled to be rotated around the longitudinal axis 104.

As illustrated, the valid key 128 independently operates both the first key followers 138 and the second key followers 144 so as to unlock the rekeyable lock cylinder 100. In the example, the first and second locking bars 154, 168 are biased in opposite directions 276, 278 and radially inward towards the racks 152, 166. As such, the first and second locking bars 154, 168 move towards the illustrated unlocked configuration via similar structural operations. In other examples, the first and second carrier subassemblies 134, 136 may have a different structural configuration as described above, and in aspects, the first and second locking bars 154, 168 may be biased in the same direction (e.g., both the left side of the cylinder body 102 or both to the right side of the cylinder body 102).

The first key follower 138 is axially aligned with the second key follower 144 and the first and second key followers 138, 144 are biased in opposite directions 280, 282 and radially inward towards the key 128. The first rack 152 is also axially aligned with the second rack 166. In the example, the first locking bar engaging slot 110 is substantially rectangular in cross-sectional shape and is similar is size and shape with the second locking bar engaging slot

112. For example, the first and second locking bar engaging slots 110, 112 have a substantially "C" shaped cross-sectional profile so as to selectively engage with the locking bars as described herein. Additionally, because the locking bars are not cammed out of engagement with the first or second locking bar engaging slot 110, 112, the transfer of rotational torque towards the racks during rotation of the plug assembly 106 is reduced. In other aspects, the first locking bar engaging slot 110 may have a different size and/or shape than the second locking bar engaging slot 112. For example, a substantially "V" or "U" shaped cross-sectional profile so as to enable a locking bar to cam out of the slot as required or desired.

When the rekeyable lock cylinder 100 is in the unlocked configuration, the plug assembly 106 is rotatable within the cylinder body 102 so as to operate the rekeyable lock cylinder 100. Additionally, a valid key can be used to unlock the rekeyable lock cylinder 100 to facilitate rekeying operations of the first and second carrier subassembly 134, 136 while the plug assembly 106 is disposed within the cylinder body 102. In the example, the rekeyable lock cylinder 100 is rekeyable with respect to one or both of the first and second carrier subassemblies 134, 136 and the first key cut 188 and/or second key cut 194 of the key 128 while the plug assembly 106 is disposed within the cylinder body 102.

In order to rekey the plug assembly 106, a valid user key is inserted into the keyway opening 124 (shown in FIG. 1) and the plug assembly 106 is rotated to a first or learn position (not shown). In the example, the first position is about 90° from a home position of the plug assembly 106 (shown in FIG. 12). The first position retains the first and second locking bars 154, 168 within the corresponding first and second racks 152, 166 and the recess 234 of the racks are aligned with the position of the protruding features 260. A tool (not shown) is inserted into one or both of the first and second rekeying tool openings 130, 132 (shown in FIG. 1) so as to push on the first and second carriers 150, 164 and move the first and second carrier subassemblies 134, 136 towards the second end 118 of the plug body 114 (shown in FIG. 2) along the longitudinal axis 104.

As each carrier subassembly 134, 136 moves along the longitudinal axis 104, the respective spring catches 158, 170 (shown in FIG. 2) move into one or more detent recess (not shown) within the inner surface of the cylinder body 102 so that each carrier subassembly 134, 136 is captured in the rotated and translated position within the cylinder body 102 (e.g., a rekeying configuration). Moving each carrier 150, 164 along the longitudinal axis 104, slides the rack engagement feature 210 of the key followers 202 (shown in FIG. 5) out of engagement from the pin engagement features 226 of the racks 212 (shown in FIG. 6). The valid key is then removed and a second key is inserted into the keyway opening 124 and used to rotate the plug assembly 106 back towards the home position and release each spring catch 158, 170. As the spring catches 158, 170 leave the detent recess of the cylinder body 102, the carriers 150, 164 are biased towards the first end 116 of the plug body 114 by the return springs 156, 169 (all shown in FIG. 2), causing the rack engagement feature 210 of the key followers 202 to slidingly insert into the pin engagement features 226 of the racks 212 in a different key cut position. At this point, the rekeyable lock cylinder 100 is keyed to the second (now valid) key and the first key no longer facilitates operation of the rekeyable lock cylinder 100. This rekeying operation is described in further detail in U.S. Pat. No. 8,656,747 B2, dated Feb. 25, 2014, and which is incorporated by reference in its entirety.

While the first and second carrier subassemblies 134, 136 are being rekeyed, the first and second locking bars 154, 168 are maintained in the unlocked position via the capture of the position of the racks 212 on the protruding features 260 and the inward biasing of the first and second locking bars 154, 168. In the example, the first and second carrier subassemblies 134, 136 are independently operable, however, because they are structurally similar, both carrier subassemblies 134, 136 need to be unlocked for the rekeying operation and to allow the plug assembly 106 to rotate. Additionally, both carriers 150, 164 of the first and second carrier subassemblies 134, 136 need to be axially moved into the rekeying positions so that the key can be removed during the rekeying process. In the example, the rekeying keys could have a different first key cut 188, second key cut 194, or both the first and second key cuts 188, 194 even though both the first and second carrier subassemblies 134, 136 will be moved for the rekeying process.

In other examples, the rekeyable lock cylinder 100 may be configured with tool-less rekeying capabilities like the configurations described in U.S. Pat. No. 8,099,988, dated Jan. 24, 2012, and U.S. Pat. No. 11,319,726, dated May 3, 2022, and which are incorporated by reference in their entireties. In these examples, the first and second carrier subassemblies 134, 136 may be moved into the rekeying position simultaneously as required or desired. As such, axial movement of the first and second carriers 150, 164 may be coupled together.

Figure 13:
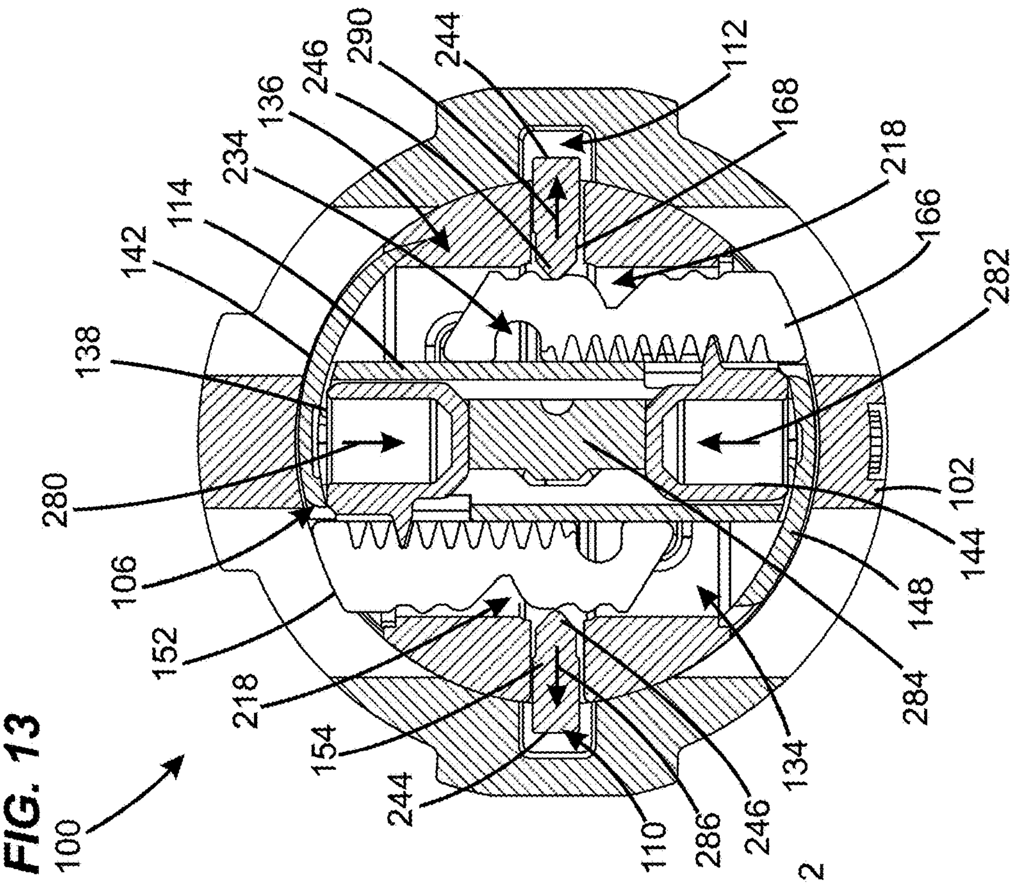
FIG. 13 is a cross-sectional view of the rekeyable lock cylinder shown in FIGS. 1 and 2 and in a locked configuration.

FIG. 13 is a cross-sectional view of the rekeyable lock cylinder 100 in a locked configuration. Certain components are described above and are not necessarily described further below. In the locked configuration, either a non-valid key 284 is inserted into the keyway opening 124 or no key is present such that the first and/or second key followers 138, 144 and the first and/or second racks 152, 166 are operationally positioned within the plug assembly 106 and the first and second locking bars 154, 168 are moved/movable towards a locked position. In the locked position, the first and second locking bars 154, 168 are disposed within a shear plane between the cylinder body 102 and the plug assembly 106 and rotation of the plug assembly 106 is prevented.

Starting first with the first carrier subassembly 134, the non-valid key 284 positions the first key followers 138 within the plug body 114 such that the first rack 152 moves and the locking bar engaging groove 218 is not aligned with the first locking bar 154. Because the first locking bar 154 is biased inward, the second end 246 cams outward against the locking bar engaging groove 218 so as to move 286 the first end 244 towards and into the first locking bar engaging slot 110 of the cylinder body 102. Once the first locking bar 154 is within the first locking bar engaging slot 110, the plug assembly 106 is blocked from rotating around the longitudinal axis 104 (shown in FIG. 1).

When no key is received within the keyway opening 124, the first key follower 138 is biased 280 towards the bottom of the plug body 114 and this will also position the first rack 152 in a position that does not align the locking bar engaging groove 218 with the first locking bar 154. It should be appreciated that the height 222 (shown in FIG. 6) of the locking bar engaging groove 218 may allow for at least a portion of the second end 246 of the first locking bar 154 to be within the locking bar engaging groove 218 in adjacent key cut positions relative to a valid key cut position (e.g., either up or down), while still blocking rotation of the plug assembly 106 and being in the locked position. In the example, only the valid key cut position enables the first locking bar 154 to move into the unlocked position described above.

Additionally, turning to the second carrier subassembly 136, the non-valid key 284 positions the second key followers 144 within the plug body 114 such that the second rack 166 moves and the locking bar engaging groove 218 is not aligned with the second locking bar 168. Because the second locking bar 168 is biased inward, the second end 246 cams outward against the locking bar engaging groove 218 so as to move 290 the first end 244 towards and into the second locking bar engaging slot 112 of the cylinder body 102. Once the second locking bar 168 is within the second locking bar engaging slot 112, the plug assembly 106 is blocked from rotating around the longitudinal axis 104.

When no key is received within the keyway opening 124, the second key follower 144 is biased 282 towards the top of the plug body 114 and this will also position the second rack 166 in a position that does not align the locking bar engaging groove 218 with the second locking bar 168. It should be appreciated that the height 222 of the locking bar engaging groove 218 may allow for at least a portion of the second end 246 of the second locking bar 168 to be within the locking bar engaging groove 218 in adjacent key cut positions relative to a valid key cut position (e.g., either up or down), while still blocking rotation of the plug assembly 106 and being in the locked position. In the example, only the valid key cut position enables the second locking bar 168 to move into the unlocked position described above.

While FIG. 13 illustrates both the first and second key cut of the invalid key moving the first and second locking bars 154, 168 into the locked position and within the cylinder body 102. It is appreciated that the invalid key may have a valid first key cut and an invalid second key cut, or a valid second key cut and an invalid first key cut, such that one locking bar is in the locked position and the other locking bar is in the unlocked position. This still results in the plug assembly 106 from being prevented from rotating within the cylinder body 102. Accordingly, only a valid key with valid first and second key cuts will enable the plug assembly 106 to be rotated within the cylinder body 102 and as illustrated in FIG. 12.

Figure 14:
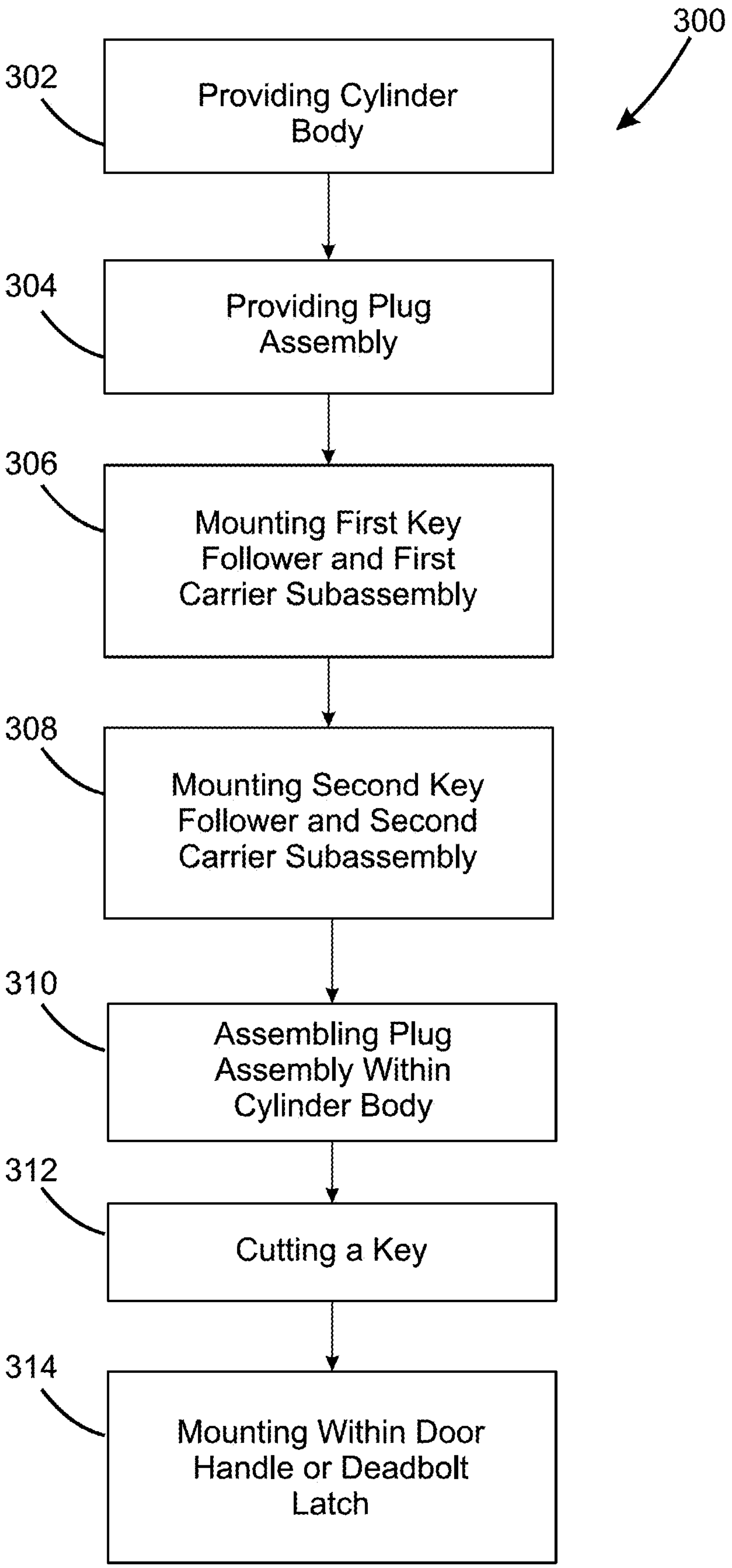
FIG. 14 is a flowchart illustrating an exemplary method of assembling a rekeyable lock cylinder.

FIG. 14 is a flowchart illustrating an exemplary method 300 of assembling a rekeyable lock cylinder. The example methods and operations can be implemented or performed by the assemblies described herein (e.g., the rekeyable lock cylinder 100 shown in FIGS. 1-13). The method 300 begins with providing a cylinder body (operation 302). The cylinder body is at least partially hollow and defines a longitudinal axis. An inner surface of the cylinder body defines at least a first locking bar engaging slot and a second locking bar engaging slot. In an example, the cylinder body is substantially cylindrical in shape. Additionally, a plug assembly having a plug body is provided (operation 304).

At least one first key follower and a first carrier subassembly are mounted to the plug body (operation 306). The first carrier subassembly includes a first carrier selectively slidable along the longitudinal axis for rekeying between different keys, a first locking bar slidably mounted on the first carrier and selectively engageable with the first locking bar engaging slot to block rotation of the plug assembly relative to the cylinder body, and at least one first rack coupled between the at least one first key flower and the first locking bar to control movement of the first locking bar.

Additionally, at least one second key follower as a second carrier subassembly are mounted to the plug body (operation 308). The second carrier subassembly includes a second carrier selectively slidable along the longitudinal axis for rekeying between different keys, a second locking bar slidably mounted on the first carrier and selectively engageable with the second locking bar engaging slot to block rotation of the plug assembly relative to the cylinder body, and at least one second rack coupled between the at least one second key flower and the second locking bar to control movement of the second locking bar. The plug assembly including the first and second carrier subassemblies is then assembled into the cylinder body (operation 310).

In an example, the method 300 may further include cutting a key (operation 312). The key has a first key cut and a second key cut, the first key cut independent and at a different position on a blade than the second key cut. In an aspect, the first key cut faces in an opposite direction relative to the second key cut. In another example, the rekeyable lock cylinder may be mounted in a door handle or a deadbolt latch (operation 314).

Figure 15:
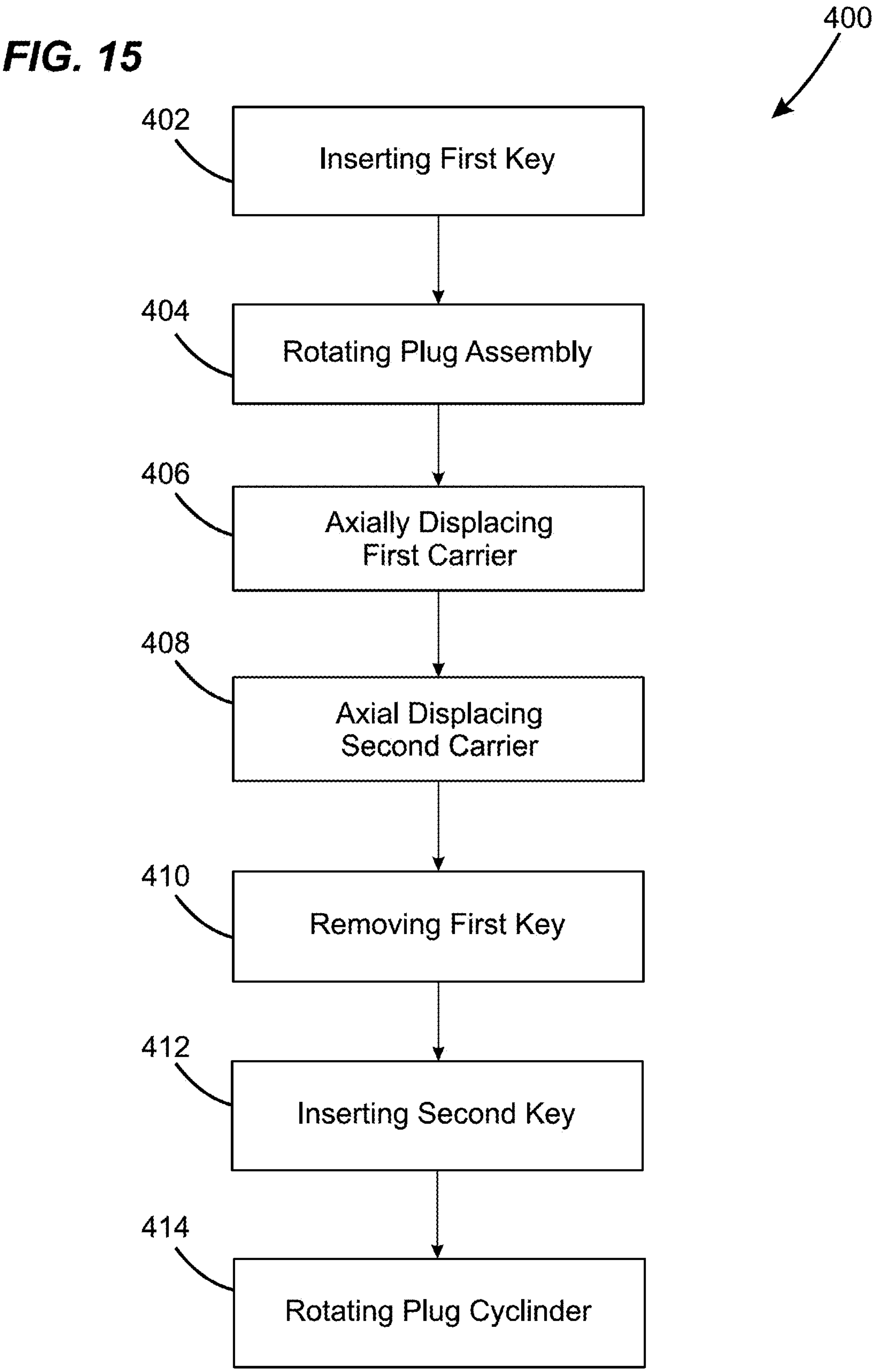
FIG. 15 is a flowchart illustrating an exemplary method of rekeying a rekeyable lock cylinder.

FIG. 15 is a flowchart illustrating an exemplary method 400 of rekeying a rekeyable lock cylinder. The example methods and operations can be implemented or performed by the assemblies described herein (e.g., the rekeyable lock cylinder 100 shown in FIGS. 1-13). The method 400 begins with inserting a first key into a keyway opening (operation 402). The keyway opening is defined in a plug body of a plug assembly of the rekeyable lock cylinder. The first key has a first key cut and a second key cut. The plug assembly includes at least one first key follower, at least one second key follower, a first carrier subassembly with a first carrier, a first locking bar, and at least one first rack coupled between the at least one first key follower and the first locking bar, and a second carrier subassembly with a second carrier, a second locking bar, and at least one second rack coupled between the at least one second key follower and the second locking bar. The first key cut positions the first locking bar in an unlocked position via the at least one first key follower and the second key cut position the second bar in an unlocked position via the at least one second key follower.

The plug assembly can then be rotated within a cylinder body (operation 404). Once rotated, the first carrier having the at least one first rack is axially displaced (operation 406) such that the at least one first rack is disengaged with the at least one first key follower. Additionally, the second carrier having the at least one second rack is axially displaced (operation 408) such that the at least one second rack is disengaged with the at least one second key follower. In an aspect, axial displacement of the first and/or second carriers occurs with a rekeying tool. In another aspect, axially displacing the first carrier occurs simultaneously with axially displacing the second carrier. In still another aspect, axially displacing the first carrier and axially displacing the second carrier occurs with a single user action.

The first key may then be removed (operation 410). A second key having at least one third key cut is inserted into the keyway opening (operation 412). The plug assembly is then rotated back so as to reengage the at least one first rack with the at least one first key follower and reengage the at least one second rack with the at least one second key follower and the first and second locking bars are rekeyed to the at least one third key cut that is different than the first key cut and the second key cut (operation 414). The second key is now the valid key with the first key being inoperable for the rekeyed lock cylinder. In an example, the method 400 may further include cutting the second key with the at least one third key cut.

The rekeyable lock cylinder described herein has a double sided keyway and the keyway includes pin followers on both sides of the keyway that mate with key cuts on both sides of the key. The two sides of the keyway operate independently and the key is directional and not symmetric. This configuration for increasing the number of pin followers without increasing the size of the cylinder and increasing the number of possible key cut combinations.

EXAMPLES

Illustrative examples of the rekeyable lock cylinder disclosed herein are provided below. An embodiment of the rekeyable lock cylinder may include any one or more, and any combination of, the examples described below.

Example 1. A rekeyable lock cylinder including: a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body; at least one first key follower slidably mounted on the plug body; at least one second key follower slidably mounted on the plug body; a first carrier subassembly supported by the plug body, the first carrier subassembly including: a first carrier selectively slidable along the longitudinal axis for rekeying between different keys; a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body, the second carrier subassembly including: a second carrier selectively slidable along the longitudinal axis for rekeying between different keys; a second locking bar slidable mounted on the second carrier and selectively engageable with the second locking bar engaging slot to block rotation of the plug assembly relative to the cylinder body; and at least one second rack coupled between the at least one second key follower and the second locking bar to control movement of the second locking bar.

Example 2. The rekeyable lock cylinder of any one of examples 1-27, wherein the at least one first key follower is biased in an opposite direction relative to the at least one second key follower.

Example 3. The rekeyable lock cylinder of any one of examples 1-27, wherein the at least one first key follower is axially aligned with the at least one second key follower.

Example 4. The rekeyable lock cylinder of any one of examples 1-27, wherein the at least one first key follower is identical to the at least one second key follower.

Example 5. The rekeyable lock cylinder of any one of examples 1-27, wherein the first locking bar is biased in an opposite direction relative to the second locking bar.

Example 6. The rekeyable lock cylinder of any one of examples 1-27, wherein the first locking bar is biased in a same direction relative to the second locking bar.

Example 7. The rekeyable lock cylinder of any one of examples 1-27, wherein both the first carrier and the second carrier axially slide for a rekeying operation.

Example 8. The rekeyable lock cylinder of any one of examples 1-27, wherein axial movement of the first and second carriers are coupled together.

Example 9. The rekeyable lock cylinder of any one of examples 1-27, wherein a first assembly that includes the at least one first key follower, the at least one first rack, and the first locking bar is independently operable relative to a second assembly that includes the at least one second key follower, the at least one second rack, and the second locking bar.

Example 10. The rekeyable lock cylinder of any one of examples 1-27, wherein the first locking bar engaging slot is spaced 180° apart from the second locking bar engaging slot.

Example 11. The rekeyable lock cylinder of any one of examples 1-27, wherein the first locking bar engaging slot has a same size and shape as the second locking bar engaging slot.

Example 12. The rekeyable lock cylinder of any one of examples 1-27, wherein the plug body defines a keyway opening, the at least one first key follower disposed on an opposite side of the keyway opening from the at least one second key follower.

Example 13. The rekeyable lock cylinder of any one of examples 1-27, wherein the keyway opening is defined by at least one projection or at least one recess of the plug body and disposed between the at least one first and second key followers.

Example 14. A rekeyable lock cylinder assembly including: a key having a blade with a first key cut and a second key cut, the first key cut facing in an opposite direction relative to the second key cut; a cylinder body defining a longitudinal axis, wherein the cylinder body defines a first locking bar engaging slot and a second locking bar engaging slot; and a plug assembly disposed at least partially within the cylinder body, the plug assembly including: a plug body defining a keyway opening for receiving the key; at least one first key follower slidably mounted on the plug body and configured to interact with the first key cut when the key is received within the keyway opening; at least one second key follower slidably mounted on the plug body and configured to interact with the second key cut when the key is received within the keyway opening; a first carrier subassembly supported by the plug body, the first carrier subassembly including: a first carrier selectively slidable along the longitudinal axis for rekeying between different keys; a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body and independent from the first carrier subassembly, the second carrier subassembly including: a second carrier selectively slidable along the longitudinal axis for rekeying between different keys; a second locking bar slidable mounted on the second carrier and selectively engageable with the second locking bar engaging slot to block rotation of the plug assembly relative to the cylinder body; and at least one second rack coupled between the at least one second key follower and the second locking bar to control movement of the second locking bar.

Example 15. The rekeyable lock cylinder assembly of any one of examples 1-27, wherein the keyway opening defines a centerline axis that is co-axial with the longitudinal axis.

Example 16. The rekeyable lock cylinder assembly of any one of examples 1-27, wherein the blade of the key includes at least one projection or at least one recess axially extending between the first and second key cuts.

Example 17. The rekeyable lock cylinder assembly of any one of examples 1-27, wherein the at least one first key follower is identical to the at least one second key follower.

Example 18. The rekeyable lock cylinder assembly of any one of examples 1-27, wherein the at least one first rack is identical to the at least one second rack.

Example 19. The rekeyable lock cylinder assembly of any one of examples 1-27, wherein the first locking bar is identical to the second locking bar.

Example 20. The rekeyable lock cylinder assembly of any one of examples 1-27, wherein the first key cut includes one or more bitting positions that axially align with the second key cut.

Example 21. A method of assembling a rekeyable lock cylinder including: providing a cylinder body defining a longitudinal axis, wherein the cylinder body defines a first locking bar engaging slot and a second locking bar engaging slot; providing a plug assembly having a plug body; mounting at least one first key follower and a first carrier subassembly to the plug body, the first carrier subassembly including a first carrier selectively slidable along the longitudinal axis for rekeying between different keys, a first locking bar slidably mounted on the first carrier and selectively engageable with the first locking bar engaging slot to block rotation of the plug assembly relative to the cylinder body, and at least one first rack coupled between the at least one first key follower and the first locking bar to control movement of the first locking bar; mounting at least one second key follower and a second carrier subassembly to the plug body, the second carrier subassembly including a second carrier selectively slidable along the longitudinal axis for rekeying between different keys, a second locking bar slidably mounted on the second carrier and selectively engageable with the second locking bar engaging slot to block rotation of the plug assembly relative to the cylinder body, and at least one second rack coupled between the at least one second key follower and the second locking bar to control movement of the second locking bar; and assembling the plug assembly including the first and second carrier subassemblies into the cylinder body.

Example 22. The method of any one of examples 1-27, further comprising cutting a key with a first key cut and a second key cut, the first key cut facing in an opposite direction relative to the second key cut.

Example 23. The method of any one of examples 1-27, further comprising mounting the rekeyable lock cylinder in a door handle or deadbolt latch.

Example 24. A method of rekeying a rekeyable lock cylinder including: inserting a first key into a keyway opening of a plug body of a plug assembly of the rekeyable lock cylinder, the first key having a first key cut and a second key cut, the plug assembly including at least one first key follower, at least one second key follower, a first carrier subassembly with a first carrier, a first locking bar, and at least one first rack coupled between the at least one first key follower and the first locking bar, and a second carrier subassembly with a second carrier, a second locking bar, and at least one second rack coupled between the at least one second key follower and the second locking bar, wherein the first key cut positions the first locking bar in an unlocked position via the at least one first key follower and the second key cut positions the second locking bar in an unlocked position via the at least one second key follower; rotating the plug assembly within a cylinder body; axially displacing the first carrier having the at least one first rack such that the at least one first rack is disengaged with the at least one first key follower; axially displacing the second carrier having the at least one second rack such that the at least one second rack is disengaged with the at least one second key follower; removing the first key; inserting a second key having at least one third key cut; and rotating the plug assembly so as to reengage the at least one first rack with the at least one first key follower and reengage the at least one second rack with the at least one second key follower and the first and second locking bars are rekeyed to the at least one third key cut that is different than the first key cut or the second key cut.

Example 25. The method of any one of examples 1-27, wherein axially displacing the first carrier occurs simultaneously with axially displacing the second carrier.

Example 26. The method of any one of examples 1-27, wherein axially displacing the first carrier and axially displacing the second carrier occurs with a single user action.

Example 27. The method of any one of examples 1-27, further comprising cutting the second key with the at least one third key cut.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rekeyable lock cylinder comprising:

a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including:

a plug body defining at least one first channel extending orthogonal to the longitudinal axis and at least one second channel extending orthogonal to the longitudinal axis, the at least one first channel and the at least one second channel axially aligned along the longitudinal axis and disposed on opposite sides of the longitudinal axis;

at least one first key follower slidably mounted at least partially within the at least one first channel of the plug body;

at least one second key follower slidably mounted at least partially within the at least one second channel of the plug body;

a first carrier subassembly supported by the plug body, the first carrier subassembly including:

a first carrier selectively slidable along the longitudinal axis for rekeying between different keys;

a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body, the second carrier subassembly including:

a second carrier selectively slidable along the longitudinal axis for rekeying between different keys;

a second locking bar slidable mounted on the second carrier and selectively engageable with the second locking bar engaging slot to block rotation of the plug assembly relative to the cylinder body; and at least one second rack coupled between the at least one second key follower and the second locking bar to control movement of the second locking bar.

2. The rekeyable lock cylinder of claim 1, wherein the at least one first key follower is biased in an opposite direction relative to the at least one second key follower.

3. The rekeyable lock cylinder of claim 1, wherein the at least one first key follower is axially aligned with the at least one second key follower.

4. The rekeyable lock cylinder of claim 1, wherein the at least one first key follower is identical to the at least one second key follower.

5. The rekeyable lock cylinder of claim 1, wherein the first locking bar is biased in an opposite direction relative to the second locking bar.

6. The rekeyable lock cylinder of claim 1, wherein the first locking bar is biased in a same direction relative to the second locking bar.

7. The rekeyable lock cylinder of claim 1, wherein both the first carrier and the second carrier axially slide for a rekeying operation.

8. The rekeyable lock cylinder of claim 7, wherein axial movement of the first and second carriers are coupled together.

9. The rekeyable lock cylinder of claim 1, wherein a first assembly that includes the at least one first key follower, the at least one first rack, and the first locking bar is independently operable relative to a second assembly that includes the at least one second key follower, the at least one second rack, and the second locking bar.

10. The rekeyable lock cylinder of claim 1, wherein the first locking bar engaging slot is spaced 180° apart from the second locking bar engaging slot.

11. The rekeyable lock cylinder of claim 1, wherein the first locking bar engaging slot has a same size and shape as the second locking bar engaging slot.

12. The rekeyable lock cylinder of claim 1, wherein the plug body defines a keyway opening, the at least one first key follower disposed on an opposite side of the keyway opening from the at least one second key follower.

13. The rekeyable lock cylinder of claim 12, wherein the keyway opening is defined by at least one projection or at least one recess of the plug body and disposed between the at least one first and second key followers.

14. A rekeyable lock cylinder assembly comprising:

a key having a blade with a first key cut and a second key cut, the first key cut facing in an opposite direction relative to the second key cut;

a cylinder body defining a longitudinal axis, wherein the cylinder body defines a first locking bar engaging slot and a second locking bar engaging slot; and a plug assembly disposed at least partially within the cylinder body, the plug assembly including:

a plug body defining a keyway opening for receiving the key, the keyway opening elongated in a transverse direction relative to the longitudinal axis and includes a first end and an opposite second end disposed on opposite sides of the longitudinal axis;

at least one first key follower slidably mounted on the plug body and disposed at the first end of the keyway opening, wherein the at least one first key follower is configured to interact with the first key cut when the key is received within the keyway opening;

at least one second key follower slidably mounted on the plug body and disposed at the second end of the keyway opening, wherein the at least one second key follower is configured to interact with the second key cut when the key is received within the keyway opening, and wherein the at least one first key follower and the at least one second key follower are axially aligned along the longitudinal axis and disposed on opposite sides of the longitudinal axis;

a first carrier subassembly supported by the plug body, the first carrier subassembly including:

a first carrier selectively slidable along the longitudinal axis for rekeying between different keys;

a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body and independent from the first carrier subassembly, the second carrier subassembly including:

a second carrier selectively slidable along the longitudinal axis for rekeying between different keys;

a second locking bar slidable mounted on the second carrier and selectively engageable with the second locking bar engaging slot to block rotation of the plug assembly relative to the cylinder body; and at least one second rack coupled between the at least one second key follower and the second locking bar to control movement of the second locking bar.

15. The rekeyable lock cylinder assembly of claim 14, wherein the keyway opening defines a centerline axis that is co-axial with the longitudinal axis.

16. The rekeyable lock cylinder assembly of claim 14, wherein the blade of the key includes at least one projection or at least one recess axially extending between the first and second key cuts.

17. The rekeyable lock cylinder assembly of claim 14, wherein the at least one first rack is identical to the at least one second rack.

18. The rekeyable lock cylinder assembly of claim 14, wherein the first locking bar is identical to the second locking bar.

19. The rekeyable lock cylinder assembly of claim 14, wherein the first key cut includes one or more bitting positions that axially align with the second key cut.

20. A method of rekeying a rekeyable lock cylinder comprising:

inserting a first key into a keyway opening of a plug body of a plug assembly of the rekeyable lock cylinder along a longitudinal axis, the first key having a first key cut and a second key cut, the plug assembly including at least one first key follower, at least one second key follower, a first carrier subassembly with a first carrier, a first locking bar, and at least one first rack coupled between the at least one first key follower and the first locking bar, and a second carrier subassembly with a second carrier, a second locking bar, and at least one second rack coupled between the at least one second key follower and the second locking bar, wherein the first key cut positions the first locking bar in an unlocked position via the at least one first key follower and the second key cut positions the second locking bar in an unlocked position via the at least one second key follower, wherein the keyway opening is elongated in a transverse direction relative to the longitudinal axis and includes a first end and an opposite second end disposed on opposite sides of the longitudinal axis, the at least one first key follower is disposed at the first end of the keyway opening and the at least one second key follower is disposed at the second end of the keyway opening, and wherein the at least one first key follower and the at least one second key follower are axially aligned along the longitudinal axis and disposed on opposite sides of the longitudinal axis;

rotating the plug assembly within a cylinder body;

axially displacing the first carrier having the at least one first rack such that the at least one first rack is disengaged with the at least one first key follower;

axially displacing the second carrier having the at least one second rack such that the at least one second rack is disengaged with the at least one second key follower;

removing the first key;

inserting a second key having at least one third key cut; and rotating the plug assembly so as to reengage the at least one first rack with the at least one first key follower and reengage the at least one second rack with the at least one second key follower and the first and second locking bars are rekeyed to the at least one third key cut that is different than the first key cut or the second key cut.

21. A rekeyable lock cylinder comprising:

a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including:

a plug body;

at least one first key follower slidably mounted on the plug body;

at least one second key follower slidably mounted on the plug body;

a first carrier subassembly supported by the plug body, the first carrier subassembly including:

a first carrier selectively slidable along the longitudinal axis for rekeying between different keys;

a first locking bar slidably mounted on the first carrier and selectively engageable with the first locking bar engaging slot to block rotation of the plug assembly relative to the cylinder body; and at least one first rack coupled between the at least one first key follower and the first locking bar to control movement of the first locking bar; and a second carrier subassembly supported by the plug body, the second carrier subassembly including:

a second carrier selectively slidable along the longitudinal axis for rekeying between different keys;

a second locking bar slidable mounted on the second carrier and selectively engageable with the second locking bar engaging slot to block rotation of the plug assembly relative to the cylinder body, wherein the first locking bar is biased in a same direction relative to the second locking bar; and at least one second rack coupled between the at least one second key follower and the second locking bar to control movement of the second locking bar.

* * * * *